United States Patent [19]

Klementich

[11] Patent Number: 5,462,315
[45] Date of Patent: Oct. 31, 1995

[54] STABILIZED CENTER-SHOULDER-SEALED TUBULAR CONNECTION

[75] Inventor: Erich F. Klementich, Houston, Tex.

[73] Assignee: Marubeni Tubulars, Inc., Houston, Tex.

[21] Appl. No.: 913,105

[22] Filed: Jul. 14, 1992

Related U.S. Application Data

[63] Continuation-in-part of Ser. No. 848,508, Mar. 9, 1992, Pat. No. 5,415,442.

[51] Int. Cl.$^6$ .................................. F16L 35/00
[52] U.S. Cl. .................. 285/24; 285/331; 285/334; 29/237
[58] Field of Search .................. 285/333, 334, 285/355, 390, 24; 29/237; 411/411, 306, 414, 423

[56] References Cited

U.S. PATENT DOCUMENTS

| | | | |
|---|---|---|---|
| 2,056,112 | 9/1936 | Protin | 285/390 X |
| 2,587,544 | 2/1952 | Sneddon | 285/390 X |
| 2,772,102 | 11/1956 | Webb | 285/334 |
| 3,109,672 | 1/1963 | Franz | 285/334 |
| 4,084,829 | 4/1978 | Falchk et al. | 285/334 X |
| 4,521,042 | 6/1985 | Blackburn et al. | 285/334 |
| 4,600,225 | 7/1986 | Blose | 285/390 X |
| 4,611,838 | 9/1986 | Heilmann et al. | 285/334 X |
| 4,629,221 | 12/1986 | Lumsden et al. | 285/334 X |
| 4,662,639 | 5/1987 | Blose et al. | 238/334 |
| 4,705,307 | 11/1987 | Chelette | 285/334 X |
| 4,796,923 | 1/1989 | Liggins et al. | 285/334 X |
| 5,044,676 | 9/1991 | Burton et al. | 285/334 |
| 5,154,452 | 10/1992 | Johnson | 285/333 |
| 5,154,452 | 10/1992 | Johnson | 285/355 |

FOREIGN PATENT DOCUMENTS

| | | |
|---|---|---|
| 2308854 | 11/1976 | France . |
| 2599811 | 12/1987 | France . |
| 8404352 | 11/1984 | WIPO . |

Primary Examiner—Dave W. Arola
Attorney, Agent, or Firm—Conley, Rose & Tayon

[57] ABSTRACT

The present invention pertains to a tubular connection having a stabilized center-shoulder seal. The stabilization of the center-shoulder seal is achieved using at least one run-out section of thread adjacent to the center-shoulder seal configuration of each connection member. The run-out section of thread is typically used in combination with a run-in section of thread on the corresponding connection member.

Preferably, the center shoulder seal configuration of each connection member is positioned between a run-out thread section and a run-in thread section. (The corresponding connection member will comprise the corresponding sections of run-in and run-out threads, respectively, so there is an interengaging set of run-in and run-out threads). Even more preferably, in addition to the connection having one set of run-out and run-in thread sections adjacent to the center-shoulder seal, the connection has a second set of run-out and run-in threads adjacent to the exterior edges of the connection (A double run-out, run-in stabilization of the center-shoulder seal). The double set of run-out, run-in sections of thread provides the most stable connection.

The most preferred center-shoulder seal design is a "locked double shoulder" design, wherein the cross section of the assembled center-shoulder area exhibits an interlocking double shoulder configuration.

The most preferred thread profile is a single hook thread profile wherein the load flank angle is a negative angle and the stab flank angle is about zero degrees. The preferred thread profile comprises chamfered stab flanks at least at locations which will come into contact upon initial telescoping of a connection pin member into a connection box member. The thread is typically a variable width thread having a progressively increasing thread width throughout a continuous section of thread.

102 Claims, 10 Drawing Sheets

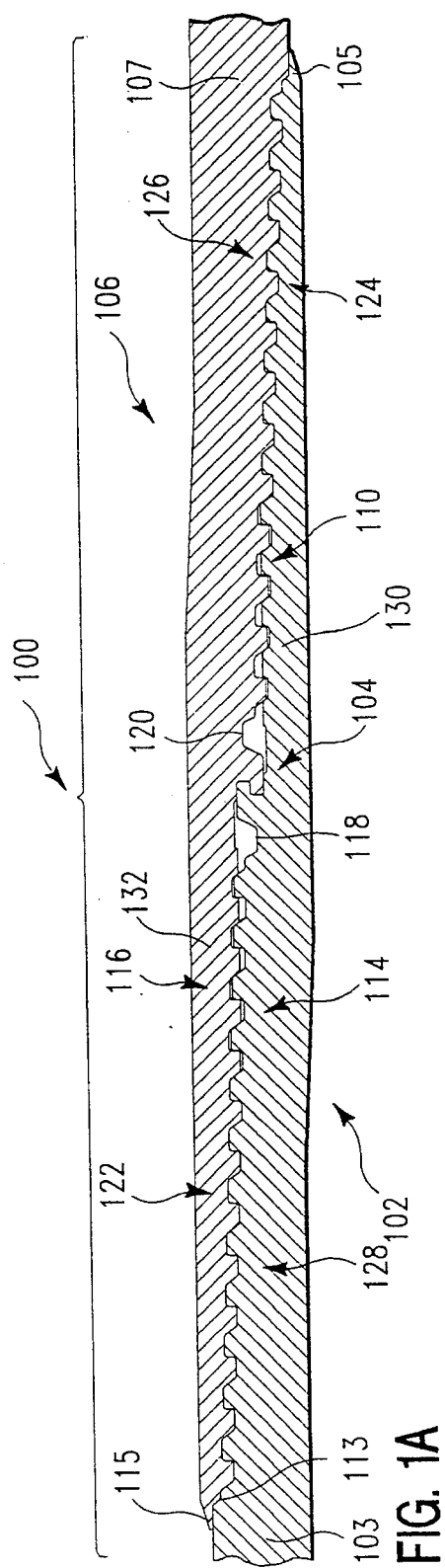
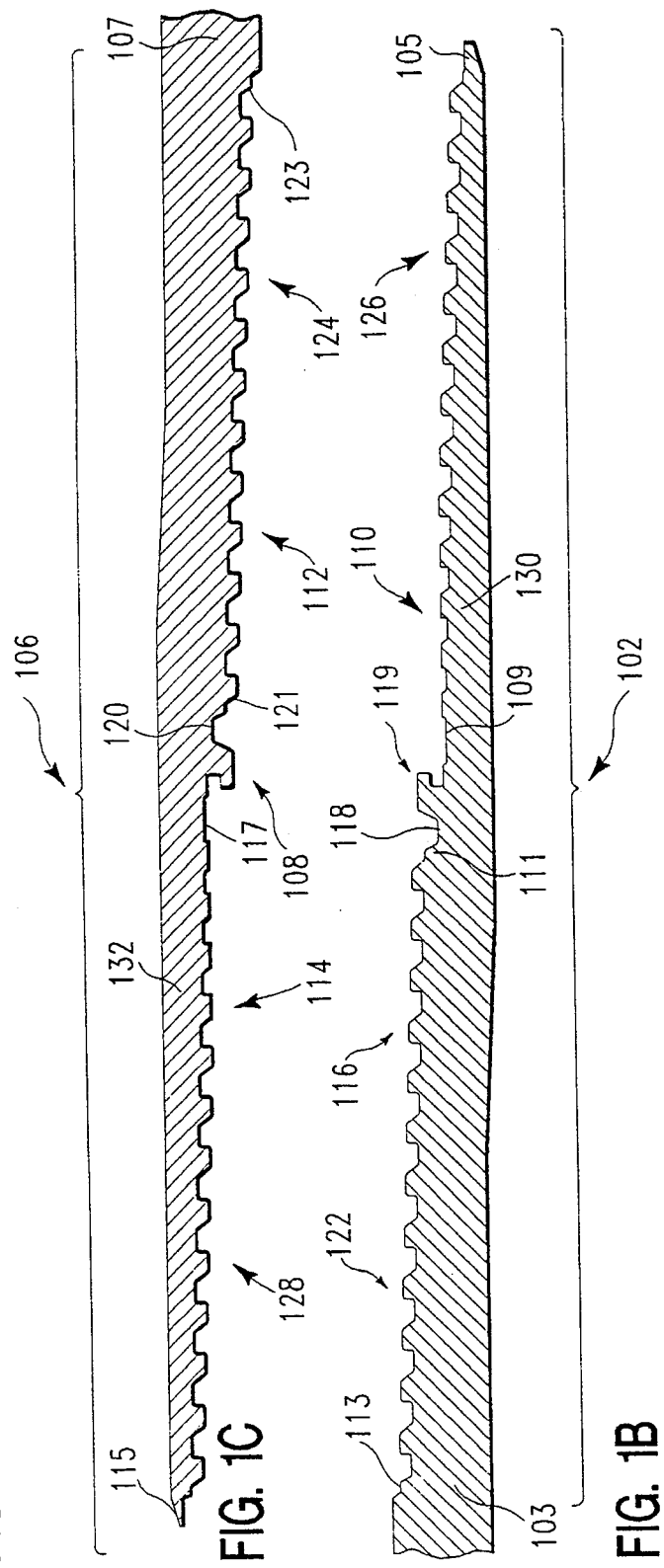
FIG. 1A
FIG. 1C
FIG. 1B

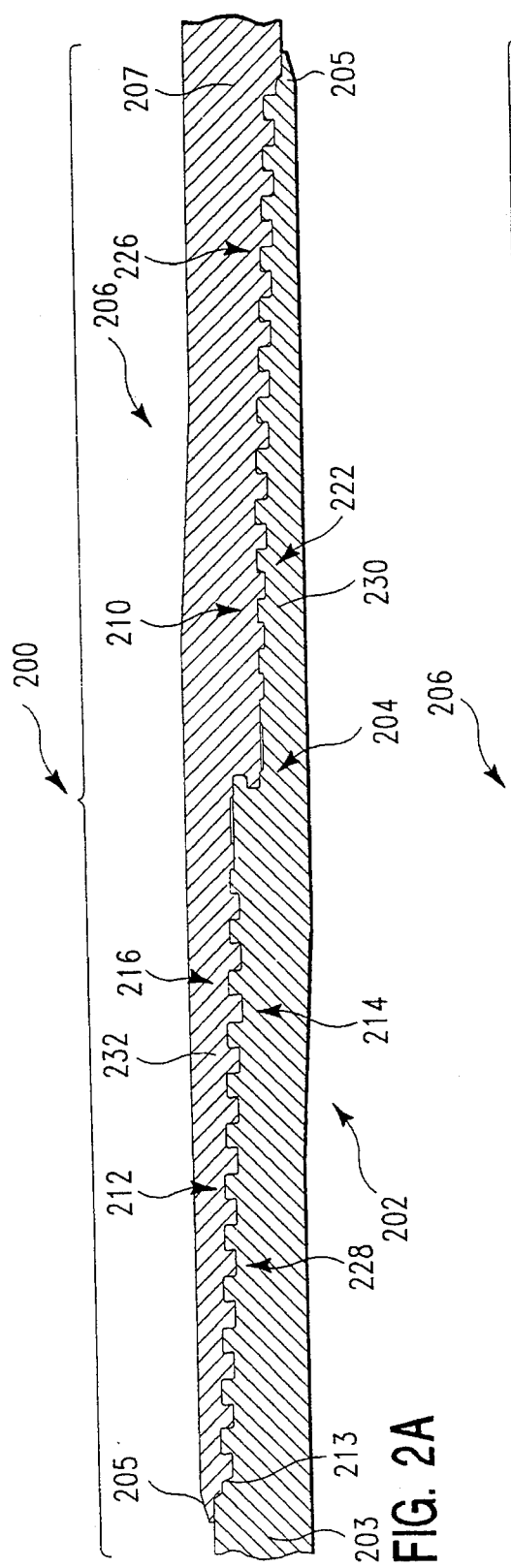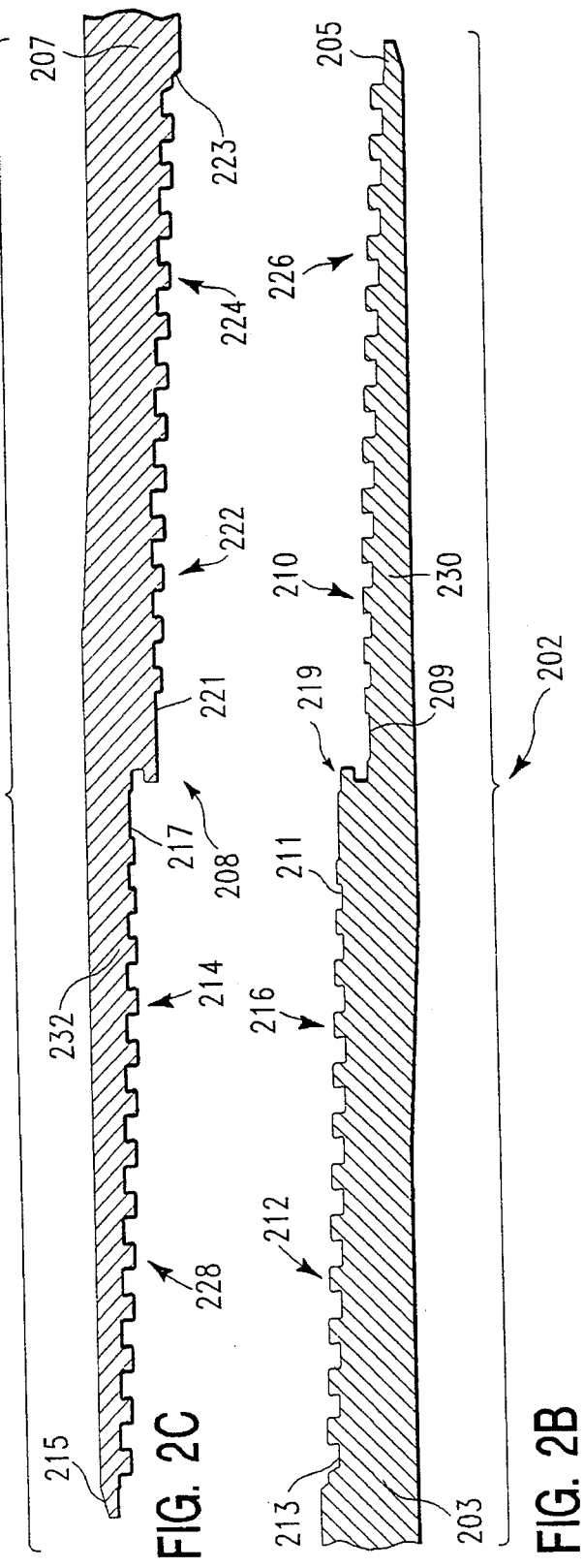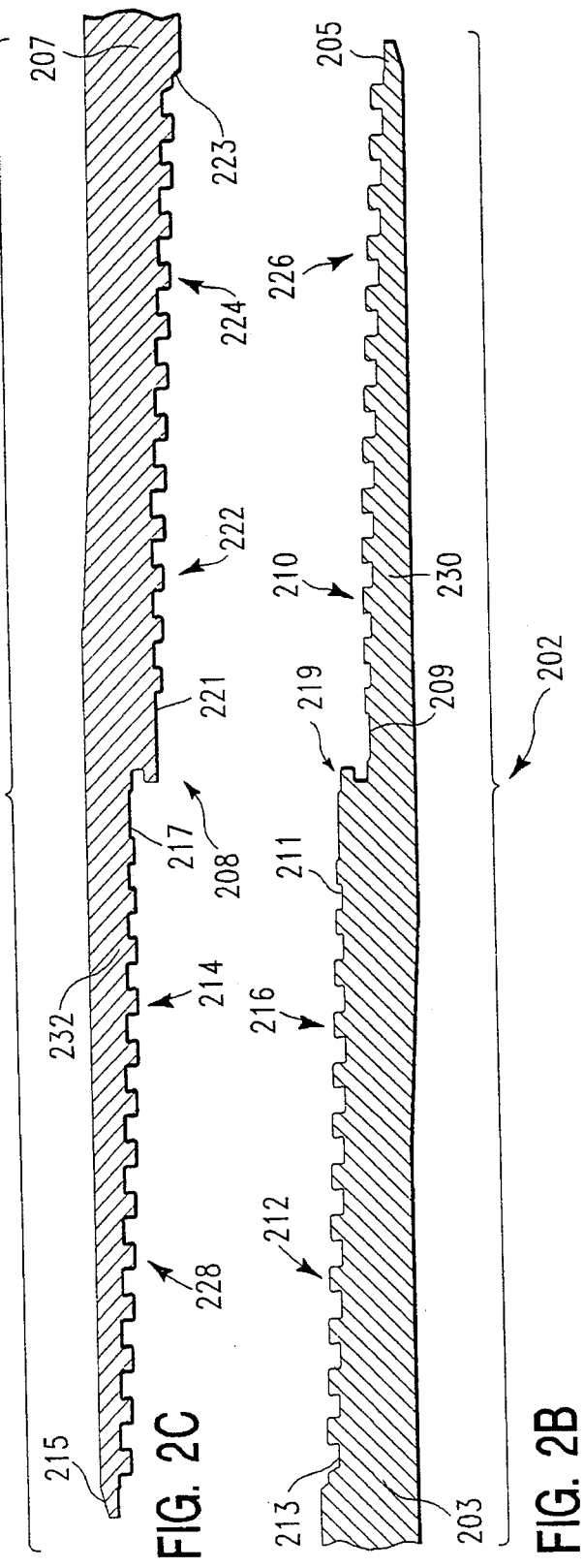

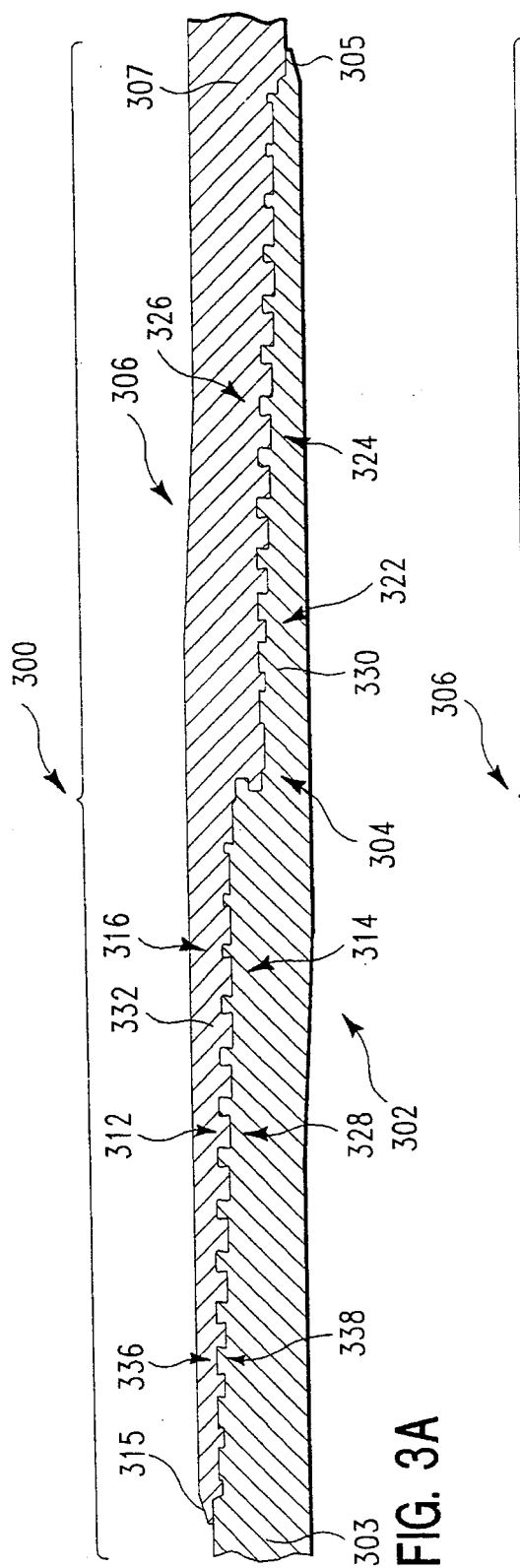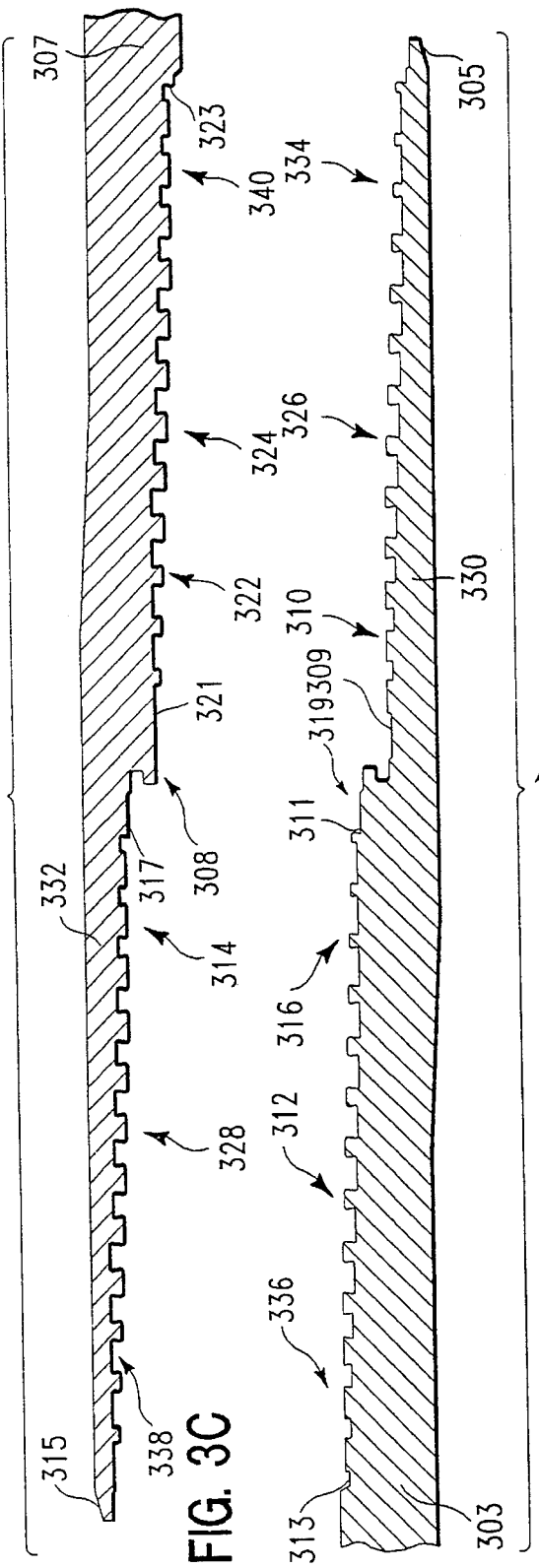

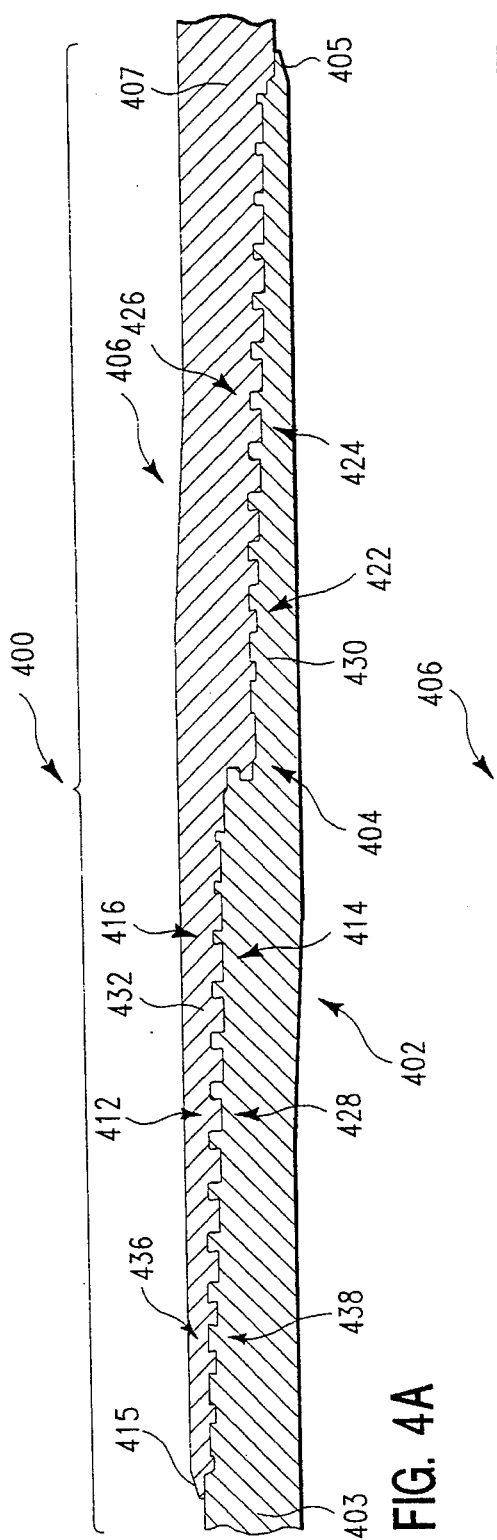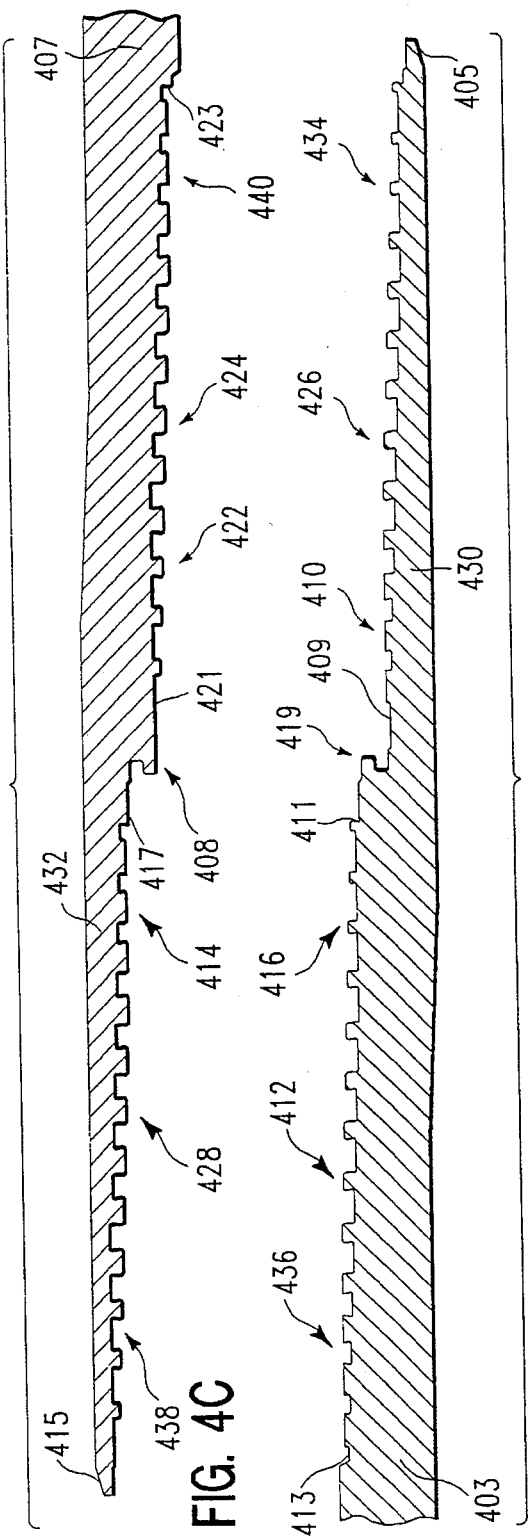

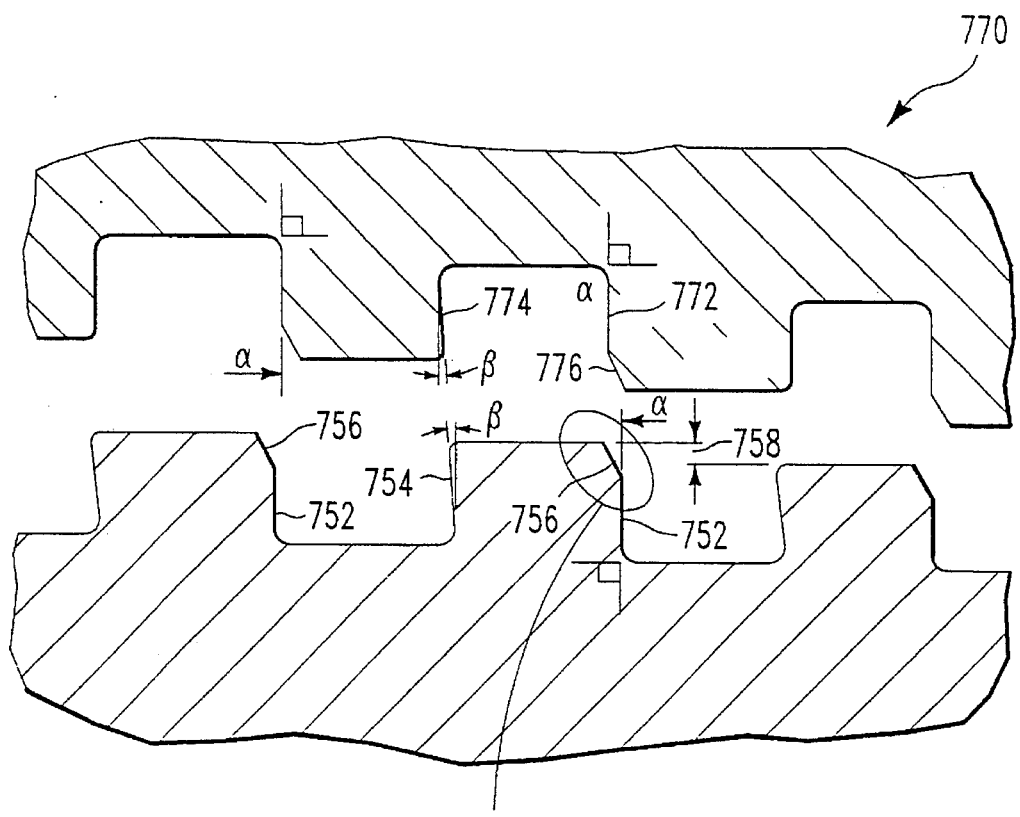
FIG. 7A
FIG. 7B + FIG. 7C
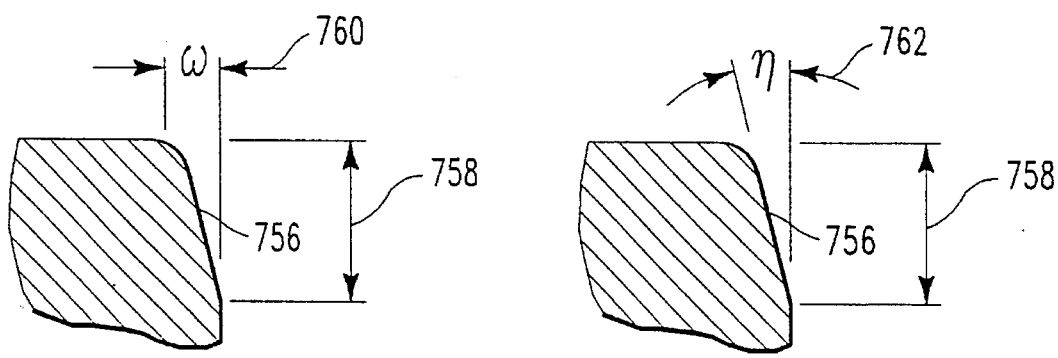
FIG. 7B
FIG. 7C

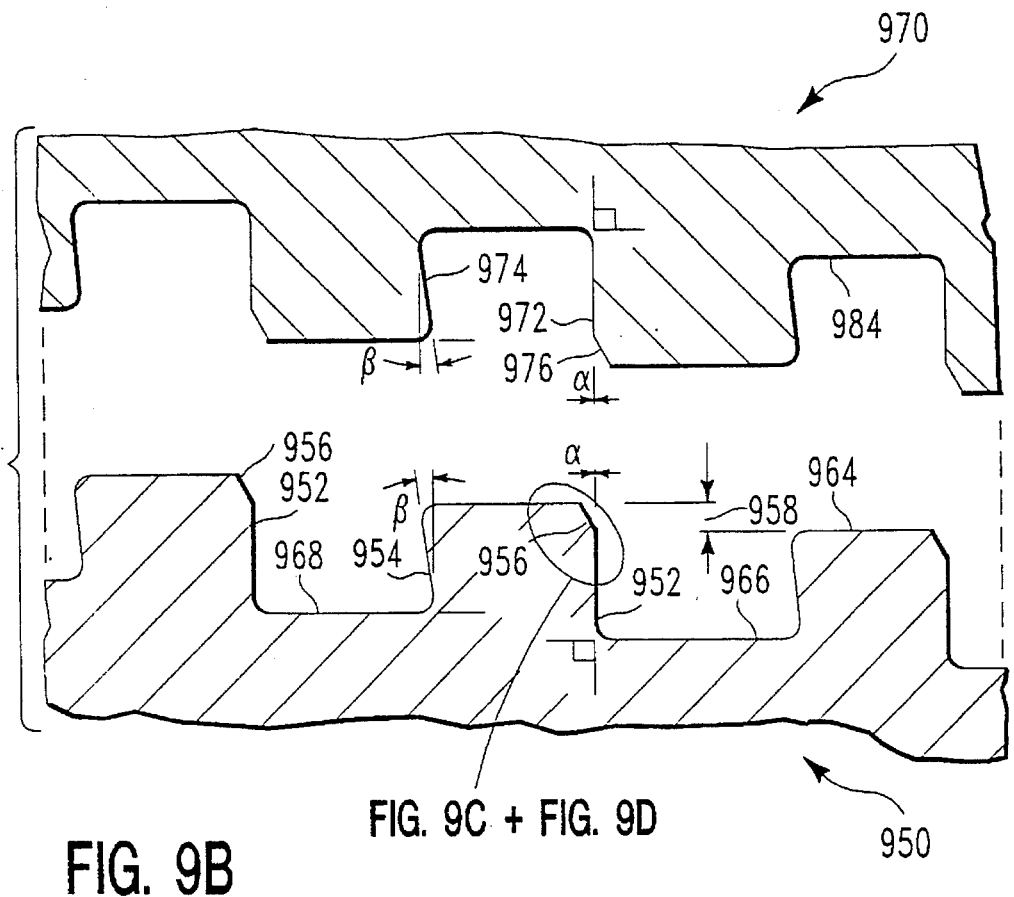
FIG. 9B
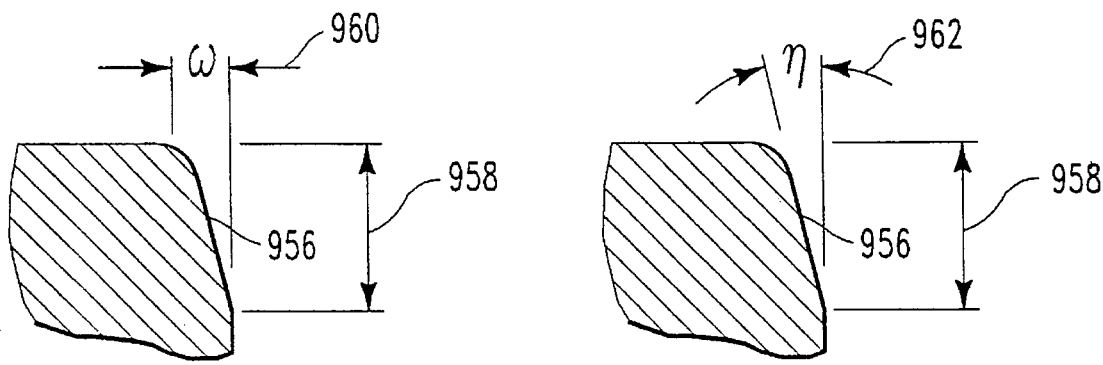
FIG. 9C
FIG. 9D

STABILIZED CENTER-SHOULDER-SEALED TUBULAR CONNECTION

This application is a continuation-in-part of U.S. application, Ser. No. 07/848,508 filed Mar. 9, 1992 and now U.S. Pat. No. 5,415,442 issued May 16, 1995.

BACKGROUND OF THE INVENTION

1. Field of the Invention

The present invention relates to tubular connections of the kind commonly used in the oil industry. In particular, the tubular connection of the present invention comprises a stabilized center-shoulder seal, wherein stabilization is provided by specialized thread constructions adjacent the center-shoulder seal. The invention also pertains to a specialized center-shoulder seal design. Further, the invention pertains to a thread profile which provides a self-centering function upon makeup of the tubular connection. This thread profile can be used with the stabilized center-shoulder seal connection as well as other connection designs known in the art.

2. Background Art

The present invention is applicable broadly for use in joining pipes, couplings and the like, and has particularly been developed for use in oil industry tubular connections, since these connections experience more severe and demanding conditions than those observed for other industries and applications. In particular, the trend in the oilfield is to minimize pipe diameter and to conserve borehole diameter. The smaller the diameter of the borehole for the well, the greater the conservation of energy and reduction of drilling costs. However, in utilizing smaller diameter pipe, it is important that the connections between adjacent tubular pipes be transparent in geometry and performance characteristics, i.e. the geometry and performance characteristics of the connection be substantially the same as that of the tubular pipe itself. Preferably, the pipe string should behave as if the pipe connections were not there. The ideal connection would have the same geometry as the pipe, such as the same inside and outside diameters, and would have the same performance characteristics such as tension rating, compression rating, internal and external pressure ratings, torsion resistance, and bending resistance, for example.

Two types of oilfield connections, namely flush joints and slim line connections, have been utilized to conserve hole diameter. The outer diameter of a flush joint connection is generally the same as the outside diameter of the tubular pipe. The outside diameter of a slim line connection is generally 2 to 3.5% greater than that of the pipe. Although the objective of such prior art pipe has been to achieve total geometric and performance characteristic transparency, such has not been possible. Often, the performance characteristics of prior art pipe have been sacrificed to achieve greater geometric transparency.

Various standards have been set for evaluating the efficiency of a pipe connection. One such efficiency is determined by the load capacity of the pipe and pipe connection in the axial direction. This tension efficiency is calculated by comparing the fracture strength of the connection with the fracture strength of the tubular pipe. Most prior art flush joint and slim line connections achieve an efficiency in the range of 65% to 75%, respectively. This efficiency, of course, varies with the type of connection, the pipe diameter and thickness, and the method of manufacture of the connection.

Prior art connections include the basic elements of threads, shoulders, and seals. The following prior art patents describe various features which have been used to produce flush and slim-line connections.

U.S. Pat. No. 671,274 to W. C. Fischer, issued Apr. 2, 1901, shows a dovetail-shaped thread design which can be applied to the outside of one tubular and the inside of another tubular to be connected together.

U.S. Pat. No. 1,474,375 to J. J. Moore, issued Sep. 20, 1923 shows what applicant has described as single hook thread design. The thread is used to fasten the forward end of the after-body of a torpedo to an air flask body.

U.S. Pat. No. 1,927,656, issued Sep. 19, 1933 to G. M. Eaton et al., describes a pipe joint for fastening together the consecutive pipe lengths of a pipe string in a manner to obtain strength at the joint without increasing the wall thickness (or with a minimum increase thereof) in the portion of the pipe in which the screw threads are cut. One of the two pipes to be joined is machined on the outside surface of the pin and the other is machined on the inside surface of the box so the two pipes can be screwed together to provide what would today be called a slim line connection. The threaded portion of each pipe is machined on a taper with the depth of the turns of the threads being the greatest at the center of the threaded portion and decreasing gradually in both directions to vanishing points at the ends of the threaded portions.

U.S. Pat. No. 2,062,407, issued Dec. 1, 1936 to G. M. Eaton et al., discloses a preferred form of pipe joint wherein the height of the threads in the threaded portion of the joint is at a maximum in the central area of the threaded portion of the joint and decreases gradually in both directions to vanishing points, somewhat similar to the joint described above. However, the thread design differs in that the vanishing of the threads corresponds with the intersection of thread fabrication lines which are not only based on a taper relative to the pipe longitudinal axis but also a line which is cylindrical or parallel to the pipe longitudinal axis. Specifically, the root of the thread at the pipe exterior edge position of the pin is located along a line parallel with the pipe longitudinal axis while the crest of the thread at the same location is located along a line at a constant taper with the pipe longitudinal axis. The root of the thread at a position more interior from the edge of the pipe is located along a line at a constant taper with the pipe longitudinal axis, while the crest of the thread at the same location is located on a line of parallel taper to the root for a distance. Finally, at the most interior thread location on the pin, the thread root continues on a taper with the pipe longitudinal axis while the crest of the thread is constructed along a line parallel with the pipe longitudinal axis. Thus, at both the exterior and interior edges of the threaded connection, the thread disappears where thread root and thread crest intersect. The thread construction of the box is complimentary to that of the pin so the two threaded members can be interengaged.

U.S. Pat. No. 2,207,005 to R. D. Haas, issued Jul. 9, 1940, pertains to a single hook thread form (as defined herein) wherein the pin member load flank is undercut to provide a cam action under pressure to draw the connection members together and establish a sealing-off function. The thread form is constructed on a taper to the longitudinal axis of the connection.

U.S. Pat. No. 2,488,566 to R. S. Sperry, issued Nov. 22, 1949 described a tapered thread structure having a lead on one flank of the helical thread which differs from the lead on the other flank of the helical thread, to provide a constantly increasing thread width from one end of the thread structure to the opposite end. This variable width thread structure is said to enable easy disassembly of a rod or pin from a socket, permitting separation of pin from socket without the need to completely unscrew the parts, while providing a wedge-like, snug interfit between the threads of the parts when coupled together. The preferred embodiment for use of the variable width thread structure is on the surface of a pull rod used in combination with a tubular work piece to be formed.

U.S. Pat. No. 3,109,672, issued Nov. 5, 1963 to William F. Franz describes a threaded pipe joint comprising a pipe member having a cylindrical outer surface and a tapered buttress thread at the end thereof vanishing along the outer cylindrical surface, providing a length of fully formed and a length of vanishing threads. The complementary coupling member having thread machined on the internal surface thereof exhibits a full height tapered thread throughout the entire length thereof. The complementary threads on each member have following flanks in bearing relationship and substantially normal to the longitudinal axis of the joint and leading flanks in bearing relationship, which leading flanks have a larger flank angle than the following flanks. Crests and roots are truncated to provide flat crests and roots which are parallel to the longitudinal axis of the joint. Crest truncations of fully formed threads exceed root truncations to provide a predetermined amount of void between the crests and roots of the complementary threads throughout the length of the joint when the pipe and coupling are in hand tight engagement. After power make-up, the crests of the coupling threads engage the roots of the vanishing pipe threads, but voids still remain between crests and roots of the fully formed threads, thus preventing the development of deleterious hoop stresses at the end of the coupling during power make-up.

U.S. Pat. No. 3,989,284, issued Nov. 2, 1976 to Thomas L. Blose (see also U.S. Pat. No. Re. 30,647, issued Jun. 16, 1981) describes a tubular connection (pipe joint) designed to produce hoop tension in the pin member and hoop compression in the box member, the connection exhibits threads having a dove-tail interfit. To achieve the dove-tail interfit, the angles formed between the thread flanks and the root wall of the thread are less than about 85°. In another described embodiment, the load flank of the thread exhibits an angularity from the direction of the connection on axis of less than about 85° while with the stab flank extends radially, in axial radial planes. The pin thread stab flank is the thread flank which is on the leading edge as the pin is telescoped (stabbed) into the box. The load flank is the trailing flank of the thread. In all cases, the threads are designed with clearances such that there is a "dove-tail interfit" between pin and box drawing the pin wall outwardly and the box wall inwardly to produce hoop tension in the pin member and hoop compression in the box member in a made up connection, i.e. there is a wedging interfit of threads in the made up joint.

Each thread member is disclosed in the '284 Blose patent as having progressively changing axial width along substantially the entire helical length thereof. Although the preferred embodiment appears to have the threads constructed on a line parallel to the pipe longitudinal axis, the possibility is disclosed of having the threads constructed on a line having constant taper from the pipe longitudinal axis. Also described is the use of an inner shoulder seal between threaded sections of the connection. In one embodiment, the inner shoulder seal is placed between two thread sections which fall on two different lines, each parallel to the pipe longitudinal axis, creating a multiple-step thread with an inner shoulder seal. The inner shoulder seal is shown and described as having a major mating (sealing) surface which is parallel to the pipe longitudinal axis or a major mating (sealing) surface which is at an axial taper.

U.S. Pat. No. 4,009,893, issued Mar. 1, 1977 to Schatton et al., discloses box and pin members having two axially spaced thread sections being separated by a radial step zone which includes, for one member, eg. the pin member, an annulus having an axial undercut, a frusto-conical end face and a radially outward bulging peripheral surface, which sealingly engages a slightly contoured surface of the box member in the step zone, while the end face of the annulus bears against a complementary, slightly contoured face in the step zone of the box member. These stop faces supplement complementary thread stop faces respectively at the end of the pin member and box member. It is advised that a flat annulus having good sliding properties, such as teflon, be interposed between the pin member annulus end face and the complementary bearing face of the box member. In one embodiment, there is a space between the pin member annulus end face and the complementary beating face of the box member, and a sealing sleeve is interposed to fill this space and the undercut space of the pin member annulus.

U.S. Pat. No. 4,076,436 to D. T. Slator et al., issued Feb. 28, 1979 describes specially designed stress relief grooves for threaded end portions of tools and for collars on reciprocating or rotating drill string mounted tools.

U.S. Pat. No. 4,161,332, issued Jul. 17, 1979 to Thomas L. Blose describes a pipe joint including pin and box members having interengaged two-step threads and interengaged annular shoulders. One of the annular shoulders of the connection is located axially between the first and second pair of threads. This shoulder is constructed so that the pin member stab flank of the shoulder is at a negative angle to the pipe longitudinal axis (preferably at about 5 degrees) to provide a semi-dovetail interfit of the shoulder on makeup of the joint. The pin member threads in general exhibit a negative angle load flank (preferably about 15 degrees) and a negative stab flank angle (typically about 30 degrees), to provide a semi-dovetail interfit with corresponding box threads; the pin member stab flank is typically not engaged, there being about 0.020 inches clearance with the corresponding box threads on normal make-up.

U.S. Pat. No. 4,224,607 to T. L. Blose, issued Jul. 17, 1979, discloses a cylindrical threaded connector having a small amount of taper to produce a controlled radial interference to prevent inadvertent thread disengagement.

U.S. Pat. No. 4,373,754 to C. A. Bollfrass, et at., issued Feb. 15, 1983, describes a threaded connector having multistepped, non-tapered thread sections. The thread profile has at least one "hooked" flank to provide improved tensile strength. The wall thickness of the female or box member of the connector is controlled to improve thread loading and to enable inwardly radial movement with the male or pin member to prevent "pulling out" of the threads under axial tensile loading. The outer thread step of the pin member may only partially engage the threads of the box member such that the critical reduction of the tube wall thickness at the thread roots is a minimum.

U.S. Pat. No. 4,384,737 to H. E. Reusser, issued May 24, 1983 discloses a tubular connection including a coupling or integral socket into which pipe sections are threaded. The outer surface of the pipe sections includes an unthreaded nose portion at the outer end of the threaded portion. The nose portion terminates with an annular surface and includes a plurality of convex surfaces of revolution extending circumferentially of the nose portion, all of which surfaces are adapted to engage the unthreaded portion of the coupling or socket to establish a fluid-tight seal. The present invention does not utilize such a pin nose design. Another feature of the Reusser invention (which is present in all claims which do not pertain specifically to the above-described pin nose design) is that surface-to-surface thread contact exists between either the minor diameter flat portions of thread on each member or between the major diameter flat portions of thread on each member, but that there not be contact between both the minor and major diameter flat portions. The present invention does not use this method of controlling stresses created during make-up of the connection. The connection of the present invention exhibits surface-to-surface thread contact between the crests and roots of successive threads for all full height threads and the majority (of not all) partial height threads.

U.S. Pat. No. 4,398,756, issued Aug. 16, 1983 to Duret et al., describes a cylindro-conical pipe joint wherein approximately 15% to 25% of the joint is threaded upon a continuous construction line which is at a taper to the longitudinal axis of the pipe, with the remaining approximately 75% to 85% of the threaded portion of the joint being threaded upon a continuous construction line parallel to the longitudinal axis of the pipe. The position of the threading which is on a taper to the pipe longitudinal axis is that which forms the entry to the connection when the pin and box are initially being telescoped together. Thus, clearance is provided by the taper of the box entry to permit ease in initial telescoping of the pin into the box, prior to actual engagement of the threads. Another feature of the Duret et al. invention is that the female (box) member has an internal shoulder against which the end face of the male (pin) member seals. The connection of the present invention relies on other sealing surfaces within the central structure of the connection, permitting the end face of the pin member to extend openly at the edge of the connection.

U.S. Pat. No. 4,570,982 to T. L. Blose, issued Feb. 18, 1986, describes a tubular connection including pin and box members having a two step thread profile with the leading thread step of the pin member being a smaller diameter than the second thread step. The thread profile of the members has a negative angle load flank and the thread steps are axially separated from one another by a reverse angle torque shoulder having one or two adjacent conical surfaces. The negative load flank angle of the threads and the reverse shoulder angle combine to lock the members together and prevent differential radial separation of the engaged conical sealing surfaces.

U.S. Pat. No. 4,591,195 issued May 27, 1986 to Chelette et al. discloses a center shoulder seal located between two threaded portions of a pipe joint, wherein the threaded portions are stepped threads constructed on a line parallel to the longitudinal axis of the pipe. The center shoulder seal is fabricated so the pin portion of the seal contains an undercut groove which can be used in combination with a sealing ring of rigid plastic or rubber material to provide a seal capable of retaining hot gases or liquids.

U.S. Pat. No. 4,603,889 to J. W. Welsh, issued Aug. 8, 1986, discloses a threaded fastener having an axis adapted to thread connect to two bodies. The fastener is threaded on the inside and the two bodies are threaded on the outside. The threading has first and second load flanks which face axially oppositely. The first flank defines a second pitch, said pitches being different and characterized in that when the fastener is screwed onto body threads the first flank tightens against one body thread when the second flank tightens against the other body thread.

U.S. Pat. No. 4,671,544, issued Jun. 9, 1987 to Donald J. Ortloff discloses a threaded pipe connection having two portions of tapered threads with tapered sealing surfaces located between the threaded portions. The tapered sealing surfaces engage a resilient seal member located in a groove about midway between the ends of one of the seal member surfaces; when the joint is made up, the sealing surfaces form independent metal-to-metal seals on both sides of the resilient seal member. In a preferred embodiment, the threaded portions are in the form of two steps, one on each side of the center sealing surface described above; the threads are wedge-shaped threads that increase in width progressively in one direction within each step of threads.

U.S. Pat. No. 4,676,529, issued Jun. 30, 1987 to Patrick E. McDonald describes a pipe joint wherein the pin and box members have two stepped portions of threads, each constructed on a line parallel with the longitudinal axis of the pipe, and having metal-to-metal sealing surfaces located between the threaded portions. The sealing surfaces provide three engaging shoulders between the pin and box; the two sets of outer shoulders have space between them at the time the set of inner shoulders is in contact. Between the set of inner shoulders and each set of outer shoulders, there is a groove; in one location the groove is in the box portion of the connection and in the other location the groove is in the pin portion of the connection. When the connection make-up torque is beyond the yield point of the metal of the set of inner shoulders, the metal extrudes into the grooves in the box and pin members to form interlocking surfaces which hold the box and pin from relative rotation.

U.S. Pat. No. 4,696,498 to K. L. Church, issued Sep. 29, 1987, describes a tubular connection having two members, one threaded on the inside (box) and one threaded on the outside (pin). Each member has a double set of steep tapered hook threads, two internal pressure seals including a compressible primary metal-to-metal seal and a supplementary seal made up of a resilient corrosion resistant material. Additionally, the connection has a primary resilient corrosion resistant external pressure seal, and a reverse shoulder engagement between the end of the pin member and a shoulder on the box member to hold the primary metal sealing surfaces in sealing engagement.

U.S. Pat. No. 4,703,954, issued Nov. 3, 1987 to Ortloff et al. describes a threaded pipe connection comprising a box having tapered internal threads and a pin having tapered external threads, wherein the threads are dovetail shaped in cross section (wedge shaped thread) and increase in width in one direction on the box and in the other direction on the pin. This design is improved over that described in U.S. Pat. No. 3,989,284 (U.S. Pat. No. Re. 30,647) in that high stress concentrations are avoided in the box between the first thread and the end of the box by making the length of the box between the first thread and the end of the box equal to or greater than 5% of the pipe diameter and by providing clearance-between the crest of the first full thread on the box and the root of the last thread on the pin and between the crest of the last full thread on the pin and the root of the first full thread on the box.

U.S. Pat. No. 4,703,959 to E. E. Reeves et al., issued Nov. 3, 1987 discloses a threaded pipe connection with compressible seal ring. The connection comprises a pin member threaded on the outside and a box member threaded on the inside. The members have threading which is tapered, with generally dovetail-shaped threads that increase in width in one direction on the pin and in the opposite direction on the box so that the pin and box threads engage to form thread seals between the flanks of the threads and between the roots and crests of the threads. The improvement is said to comprise an annular groove intermediate the ends of the threads on one of the box and pin to form a cavity between the groove and the threads on the other of the box and pin and a ring-shaped seal member of compressible material located in the annular groove.

U.S. Pat. No. 4,753,460, issued Jun. 28, 1988 to Lawrence Y. Tung, discloses a tubular connection having a small diameter thread set and a large diameter thread set, the small thread set having a lesser number of threads than the large set. A primary torque shoulder is located between the thread sets and a secondary torque shoulder is located behind the large thread set. In the preferred embodiment, the initial partial thread on the pin of both sets and the last partial thread of the small set on the box has a cylindrical root contour (the root contour is constructed on a line parallel with the longitudinal axis of the pipe), whereas the remainder of threads exhibit a tapered root contour. The longitudinal taper angle of the pin thread sets are dissimilar to the box thread sets, there being a maximum separation of the sets near the center of the connection. At the center, a seal is provided; the last threads adjacent to the center shoulder on the threaded sets are hooked (the angle of the pin load flank is negative with respect to the pipe longitudinal axis). In all embodiments described, the threads exhibit a negative load flank and a positive stab flank. The center shoulder area of the pin exhibits two flanks, one of which is positive (near the small diameter step of threads) and one of which is negative (near the center of the shoulder and about midway between the two steps of threads).

U.S. Pat. No. 4,822,081 to T. L. Blose, issued Apr. 18, 1989, describes a driveable two-member tubular connection, and in particular a thread form for the connection. The thread form utilizes converging, trapped thread flanks and mating shoulders and end faces with dissimilar angles. A two step thread design is illustrated, wherein variable width "trapped" threads are present on each step of threads. The thread crests and roots are described as making contact before the thread flanks are touching. This Blose et al. invention is concerned with the benefit of the thread stab flanks in assisting the shoulders/end faces in resisting axial compressive loading and with the different angles between mating shoulders and end faces to reduce deformation of the shoulders upon axial compressive loading.

U.S. Pat. No. 4,893,844 to K. D. Chelette et al., issued Jan. 16, 1990, discloses a tubular connection with ventable seal. A deforming seal member is disposed between two surfaces such that a space is provided to at least one side of the sealing member. The connection comprises box and pin members having hooked threads, a stop shoulder between the two members and various seal means.

U.S. Pat. No. 4,917,409, issued Apr. 17, 1990 to Doyle E. Reeves describes a threaded connection employing a tapered, wedge shaped thread. The threads increase in width in one direction on the box and in the other direction on the pin. The improvement over the prior art appears to be in the ability of the thread design to be used with pipe thread lubricants; to accommodate such lubricants, the thread is designed to eliminate the radial clearance between the thread roots and crests so that the possibility of creating an expansible chamber upon connection make-up that can entrap the liquid or paste-like thread lubricant therein, to produce a false torque reading is greatly minimized, if not entirely reduced. The wedge-shaped thread can be a dovetail or semi-dovetail thread profile. A variable width thread construction (wherein thread width increases progressively in a given direction) is used in combination with the dovetail or semi-dovetail thread profile (as in the Blose U.S. Pat. No. 3,989,284). The specification and original claims of Reeves discloses that the load and stab flanks of the thread fully engage "at substantially the same time upon rotational make-up of the threaded connection" Col. 4, lines 43–48. Although only continuation applications were filed during prosecution (no continuation-in-part applications which would permit the introduction of new matter), the claims were amended in a subsequent continuation application to contain the limitation that the thread flanks did not fully engage at substantially the same time. Thus, there is presently some confusion as to exactly what is taught by Reeves.

Another concept disclosed and dependently claimed in Reeves is that it is desirable to increase the thread width at the widest portion in the range of approximately four times the thread width at the narrowest portion at the same thread location. There is no discussion as to why this provides an advantage over prior art (which is said to show less of an increase in thread width).

U.S. Pat. No. 4,944,538 to S. R. Read, issued Jul. 31, 1990, describes a threaded pipe joint having improved seal ring entrapment.

U.S. Pat. No. 4,958,862 to C. Capelli et al., issued Sep. 25, 1990, discloses a tubular connection comprising a pin member having at least one external tapered thread and a box member with complementary internal threads. An end part of the pin member beyond each thread has a conical seal surface and the box member has a conical seal surface with the same taper as that of the pin member, so that upon tightening of the joint a seal is created between pin and box at the forward end region of the pin member.

U.S. Pat. No. 5,029,906 to K. D. Chelette et al., issued Jul. 9, 1991, pertains to a deformable sealing member used to provide a pressure vent for mating tubular members. A typical threaded coupling comprises pin and box members each having a stepped thread design of hooked configuration on at least one side of a stop shoulder.

U.K. Patent Specification 137,777 of W. Pickard, published in 1920, shows a variety of thread designs which can be used to connect two or more parts or objects laterally or which, on entering a material, will become anchored therein and resist separation in all directions at right angles to the longitudinal axis of the connection. FIG. 8 of the disclosure shows a single hook thread profile. FIG. 10 shows a double hook thread profile.

U.K. Patent Application of K. Maruyama, published Nov. 4, 1981, describes a fluid tight thread joint for oil or gas well pipes. The joint comprises box and pin members; the thread on the pin starts from the pin end as a rounded triangular thread and becomes a buttress thread; the thread on the box member is formed in a corresponding manner.

DEFINITIONS

For convenience and accuracy of description, the following definitions have been adapted for use in describing the connection of the present invention.

The "pin member" of a connection is understood to mean the male portion of a tubular member which is threaded on its external surface to be interengaged with threads on a box member to provide a connection.

The "box member" of the connection is understood to mean the female portion of a tubular member which is threaded on its internal surface to be interengaged with threads on a pin member to provide a connection.

A connection having a "two-step thread" is understood to mean a connection having two threaded portions wherein one threaded portion has a greater radius from the longitudinal axis of the pipe than the other threaded portion.

A "center shoulder seal" is understood to mean a section of a connection disposed between at least two threaded portions, which section exhibits directly contacting surfaces between the pin and box members, or between the pin and box members and a third component such as an annular sealing sleeve, so that the section provides a seal for preventing the passage of fluid through (across the threads of) the assembled connection.

A "thread root" is understood to mean the thread location at which the wall of the tubular member has been machined away to its maximum depth. The thread root defines the major diameter of a box thread and the minor diameter of a pin thread.

A "thread crest" is understood to mean the thread location at which the wall of the tubular member has been machined to its minimum depth (in some cases, none of the wall will have been machined away at the crest of the thread). The thread crest defines the major diameter of a pin thread and the minor diameter of a box thread.

A "run-out thread" is understood to mean a portion of thread having its roots machined on a taper with respect to the longitudinal axis of the tubular member, but having its crests machined parallel to the longitudinal axis of the tubular member; gradually the construction (machining) lines of the crests and roots of the thread intersect and the thread disappears. In an assembled tubular connection, a run-out thread on a pin member or box member typically corresponds with a run-in thread on the corresponding box member or pin member, respectively.

A "run-in thread" is understood to mean a portion of thread having its roots machined parallel to the longitudinal axis of the tubular member, but having its crests machined on a taper with respect to the longitudinal axis of the tubular member; from an initial point, the construction lines of the crests and roots of the threads diverge, ultimately achieving a full height thread. In an assembled tubular connection, a run-in thread on a pin member or box member typically corresponds with a run-out thread on the corresponding box member or pin member, respectively.

A "thread stab flank" is understood to mean the more forward or leading flank of the thread when the pin is telescoped into the box.

The "thread load flank" is understood to mean the trailing flank of a thread upon telescoping of the pin into the box.

A thread "flank angle" is understood to mean the angle formed between the thread flank and a line constructed at the root of the thread flank, which line is perpendicular to the longitudinal axis of the connection (tubular). For ease in understanding, flank angles are defined in geometric terminology. For example, for a connection member cross-sectional drawing showing the connection member with its leading, threaded end toward the fight hand side and its trailing threaded end (typically followed by extended tubular) toward the left hand side, a positive flank angle is one wherein rotation of the perpendicular line toward the thread flank is in a clockwise direction, and a negative flank angle is one wherein rotation of the perpendicular line toward the thread flank is in a counter-clockwise direction. In the connection drawings illustrated throughout this application the connection pin member is shown at the bottom of the drawings with its leading edge on the right hand side while the connection box member is shown at the top of the drawing with its leading edge on the left hand side. Thus, the box member drawing can be reoriented to have its leading edge on the fight hand side for purposes of viewing the direction of rotation of the line constructed perpendicular to the connection longitudinal axis at the root of the thread flank. As described previously, the stab flank of the thread of each connection member is the thread flank which is leading or most forward as the connection members are telescoped together.

A "corresponding connection member portion" is understood to mean the portion of a connection member in contact with the member being discussed, upon assembly of the connection. For example, when a portion of the pin member of the connection is discussed, its corresponding connection member portion is the portion of the box member which will be in contact with that portion of the pin member upon assembly of the connection.

"Complementary engagement" is understood to mean the interengagement of corresponding members wherein both corresponding members are threaded in sections having essentially equal thread section length on each member, and wherein the entire height of thread on at least one member per threaded section is completely encompassed within the thread height of the other corresponding member threaded section.

A "lead-in thread" is understood to mean a starting portion of full-height or nearly full height threads which are machined on a taper to the longitudinal axis of the tubular member and beginning adjacent to the center shoulder seal configuration. In an assembled tubular connection, a lead-in thread on a pin member or box member corresponds with a run-out thread on the corresponding box member or pin member, respectively.

SUMMARY OF THE INVENTION

In accordance with the present invention, a tubular connection comprising at least two connection members and a center shoulder seal has been developed in a manner which provides stabilization of the center shoulder seal and improved efficiency (strength of connection/strength of tubular) of the connection.

Also in accordance with the present invention, a center shoulder seal design which provides multiple metal-to-metal sealing surfaces is described. This seal design comprises a locked double shoulder configuration.

In addition, the invention pertains to a thread profile which provides a self-centering function during make-up (assembly) of the connection.

Although the present invention can be applied to connections comprising tubulars and couplings, the most frequent use of the invention will be in the form of a tubular connection comprising two connection members, and thus the invention is described in this form below.

With reference to a tubular connection comprising two connection members, namely a pin member and a box member, the stabilization of the center shoulder seal is achieved using at least one run-out section of thread adjacent to the center shoulder configuration of each connection member. Typically, the at least one run-out section of thread is located adjacent the center shoulder configuration on that portion of the connection member at which the wall thickness is less. The run-out section of thread is typically used in combination with a run-in section of thread on the corresponding connection member. However, a run-out section of thread can be used in combination with a full height lead-in thread on the corresponding connection member.

Preferably, a run-out section of thread and a run-in section of thread are used together on the same connection member, with the center shoulder configuration located between the two sections of thread. The corresponding connection member will also comprise the corresponding sections of run-in and run-out threads, respectively, so there is one set of run-in and run-out threads adjacent the center shoulder seal. Even more preferably, in addition to the connection having one set of run-out and run-in thread sections adjacent to the center shoulder seal, the connection has a second set of run-out and run-in threads adjacent to the terminal ends of the connection. Such a double set of run-in, run-out thread sections stabilizes the center shoulder seal and the entire connection. The double set of run-in, run-out sections of threads also provides the most efficient connection.

When a connection member exhibits a single run-out thread adjacent to one side of the center shoulder configuration and a full height lead-in thread adjacent to the other side of the center shoulder configuration (with corresponding thread sections on the other connection member), a relief groove may be disposed between the center shoulder configuration and the full height thread. The relief groove permits proper interengagement of the threads upon assembly of the connection and facilitates machining of the full height lead-in thread. When a single set of run-out, run-in threads is used, with the center shoulder seal located between them, or when a double set of run-out, run-in threads is used, it is typically not necessary to use such a relief groove.

The most preferred center shoulder seal design is a "locked double shoulder" seal which provides an interlocking design, wherein a longitudinal cross section of the assembled pin and box contacting surfaces (in the center shoulder area) exhibits a reverse block S shape having extended tails on the S. Typically the assembled locked double shoulder configuration cross-section is two to three times as "high" in the radial direction (perpendicular to the tubular longitudinal axis) as it is "wide" in the axial direction (parallel to the connection longitudinal axis). In addition, the height is typically ¼ to ⅓ of the pipe body wall thickness. This seal design provides four (4) or five (5) zero clearance, metal-on-metal sealing surfaces and two (2) or three (3) close tolerance sealing surfaces which can be plugged with thread compound, on normal assembly, depending on amount of designed interference and tolerancing.

Although the locked double shoulder center seal is preferred, other center shoulder designs which are known in the art can also be stabilized using the run-out, run-in thread constructions described above adjacent to the center shoulder. Examples of other shoulder designs which can be stabilized include, not by way of limitation, square shoulder; hook shoulders (wherein the shoulder exhibits at least one negative angle relative to the connection longitudinal axis; square shoulders with a frustrum seal; annular shoulders (shoulder on a taper with the connection longitudinal axis); shoulders comprising grooves or an annulus having an axial undercut which employ a sealing sleeve, ring or annulus; and shoulders designed to extrude a portion of their mass laterally into adjacent grooves upon assembly of the connection.

The profile of the individual thread which can be used to make up the run-out, run-in thread sections is preferably selected from the group comprising double hook thread and single hook thread; although other thread profiles standard in the industry can be used.

The double hook thread profile is preferred in terms of mechanical performance. The double hook thread exhibits a negative load flank angle and a positive stab flank angle. A double hook thread profile in which the absolute sum of the load and stab flank angles (independent of the sign of the load and stab flank angles) totals less than about 20 degrees will function well in the present invention. Preferably, the negative load flank angle does not exceed about 8 degrees and the positive stab flank angle does not exceed about 5 degrees. Most preferably, the negative load flank angle ranges from about zero degrees to less than 5 degrees and the positive stab flank angle ranges from about zero degrees to less than 2 degrees, with the absolute sum of the angles being less than 5 degrees.

The single hook thread comprises a negative load flank angle ranging from about zero degrees to about 15 degrees and a stab flank angle ranging from zero degrees to a negative angle of about 35 degrees. Preferably the negative load flank angle is less than 8 degrees and the negative stab flank angle is less than 20 degrees. More preferably, the negative load flank angle ranges from about zero degrees to less than about 8 degrees, while the stab flank angle ranges from about zero degrees to a positive angle of less than about 8 degrees. Most preferably, the negative load flank angle ranges from about zero degrees to less than about 8 degrees, while the stab flank angle ranges from zero degrees to a positive angle of less than 5 degrees.

The double hook and single hook thread profiles described above are preferably used in combination with a variable width thread, wherein the thread on each member changes progressively in axial width, with the thread width of the pin member progressively increasing from the leading or forward end toward the following or trailing end of each step of threads, and the thread width of the box member increasing in the opposite direction.

The make-up of the connection having single hook or double hook threads is greatly improved by providing a chamfer on the stab flank of the thread profile. This chamfer provides a self-centering function during telescoping of the pin member into the box member. In addition, the chamfer provides increased surface contact area between the members at the time of telescoping, reducing the overall load at any particular contact point and reducing damage to the connection on make-up. The axial distance of travel or width of the chamfer is preferably about 0.005 inches or less, with the degree of the chamfer being a function of the thread pitch and taper. The degree of chamfer is such that the radial height of the chamfer (perpendicular to the connection longitudinal axis) is approximately equal to the step height between the chamfered stab flank and the preceding load flank. The height of the stab flank minus the height of the preceding thread load flank is typically called the step height.

BRIEF DESCRIPTION OF THE DRAWINGS

FIG. 1A shows a schematic of a longitudinal cross-sectional view of one embodiment of the assembled connection of the present invention, wherein the connection comprises a locked double shoulder center-shoulder seal, a single run-out thread section on the pin member adjacent one side of the center shoulder seal and a full height lead-in thread section on the pin member adjacent the other side of the center shoulder seal, with corresponding thread configurations on the box member.

FIG. 1B shows a schematic of a longitudinal cross-sectional view of the pin member shown in FIG. 1A.

FIG. 1C shows a schematic of a longitudinal cross-sectional view of the box member shown in FIG. 1A.

FIG. 2A shows a schematic of a longitudinal cross-sectional view of a second embodiment of the assembled connection of the present invention wherein the connection comprises a locked double shoulder configuration forming the center-shoulder seal and a set of run-out and run-in thread sections on each side of the center shoulder seal.

FIG. 2B shows a schematic of a longitudinal cross-sectional view of the pin member shown in FIG. 2A.

FIG. 2C shows a schematic of a longitudinal cross-sectional view of the box member shown in FIG. 2A.

FIG. 3A shows a schematic of a longitudinal cross-sectional view of a third embodiment of the assembled connection of the present invention, wherein the connection comprises a locked double shoulder center-shoulder seal and a double set of run-out and run-in thread sections, with one set being adjacent to the center-shoulder seal and the other set being disposed at the terminal ends of the pin and box members.

FIG. 3B shows a schematic of a longitudinal cross-sectional view of the pin member shown in FIG. 3A.

FIG. 3C shows a schematic of a longitudinal cross-sectional view of the box member shown in FIG. 3A.

FIG. 4A shows a schematic of a longitudinal cross-sectional view of a fourth and most preferred embodiment of the assembled connection, wherein the connection comprises a locked double shoulder center-shoulder seal, a double set of run-out and run-in thread sections, and the preferred thread profile (a single hook, variable-width thread having chamfered stab flanks).

FIG. 4B shows a schematic of a longitudinal cross-sectional view of the pin member shown in FIG. 4A.

FIG. 4C shows a schematic of a longitudinal cross-sectional view of the box member shown in FIG. 4A.

FIG. 7A shows a schematic of a longitudinal cross-sectional view of a preferred single hook thread profile of the present invention having a negative load flank angle, a zero degree (right angle) stab flank and a chamfered stab flank. Most preferably this thread profile would be a variable width thread, wherein the thread on each member changes progressively in axial width.

FIG. 7B is an enlarged cross-sectional view of a chamfered stab flank of FIG. 7A particularly illustrating the width, $\omega$, of the chamfer.

FIG. 7C is an enlarged cross-sectional view of a chamfered stab flank of FIG. 7A particularly illustrating the chamfer degree, n, of the chamfer.

FIG. 9B–9D show a schematic of a longitudinal cross-sectional area of a portion of the single hook thread profile of the pin and box members shown in FIG. 9A.

DESCRIPTION OF THE PREFERRED EMBODIMENTS

Figure 5A:
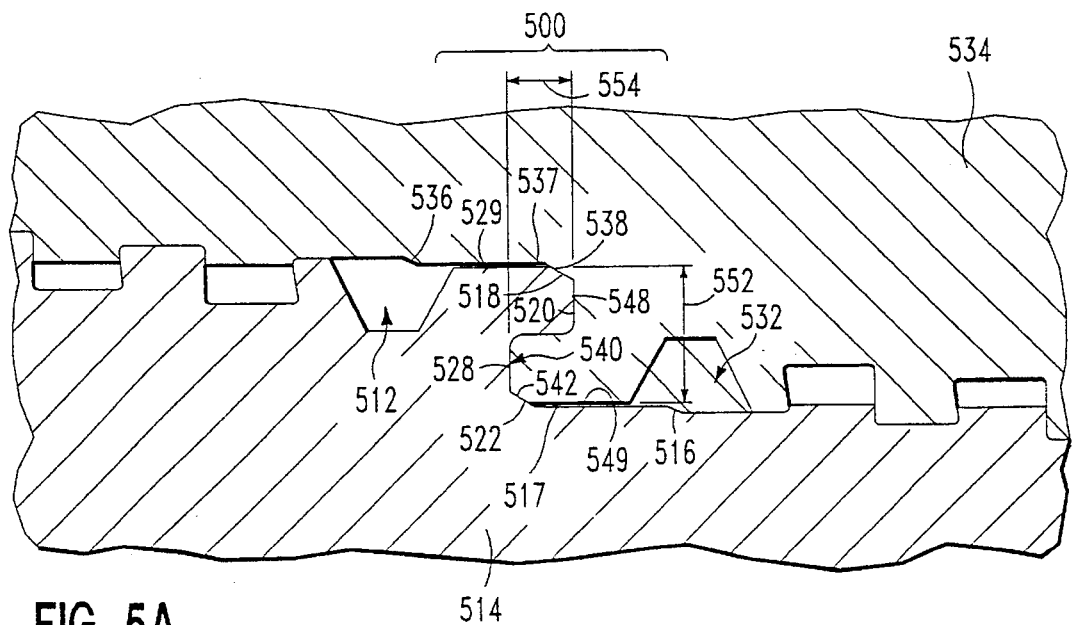
FIG. 5A shows a schematic of an enlarged view of the longitudinal cross-section of the locked double shoulder center-shoulder seal of the assembled connection shown in FIG. 1A.

The tubular connection of the present invention is applicable broadly for use in joining pipes, couplings and the like, but will be described in terms of oil industry tubular connections, since this is one of the highest value uses for the invention. In particular the invention is most typically used in flush joint or slim line tubular connections, where it is desired to minimize any variation in the outside and inside diameter dimensions between the connections and the assembled tubular members. The two major uses for the connection of the present invention are as a flush joint liner, typically having a flush outside diameter, and a liner tie-back, typically a formed connection having a maximum of +3.5% variation in outside diameter.

The tubular connection of the present invention utilizes a center seal (between at least two threaded sections of connection) to prevent fluids (liquids or gases) from passing through (across the threads of) the connection. The preferred embodiments of the invention will be described as having a locked double shoulder center shoulder seal, which will be described in detail subsequently. However, other center seal designs such as, for example, square shoulder, hook shoulder, square shoulder with frustrum seal, and annular shoulder can be used in the stabilized center-shoulder-sealed tubular connection of the present invention.

In accordance with the present invention, the center shoulder seal is stabilized so that it can withstand various forces placed on the assembled length of tubulars without significant damage to and/or leakage through the seal. The stabilization is provided by using various combinations of thread sections adjacent to the center shoulder seal. In particular, stabilization of the center shoulder seal is achieved using at least one run-out section of thread adjacent to the center shoulder seal configuration of each connection member. The run-out section of thread on one connection member is typically used in combination with a run-in section of thread on the corresponding connection member.

However, a run-out section of thread on one connection member can be used in combination with a full height lead-in thread on the corresponding connection member.

FIGS. 1 through 4 illustrate four different preferred embodiments of the connection of the present invention. Each of the four preferred connections illustrated in FIGS. 1–4, have certain common features which will now be described with respect to embodiment one of FIG. 1. Referring now to FIGS. 1A, 1B and 1C, the pipe joint or threaded connection of the present invention, generally designated 100 in FIG. 1A, includes a pin member 102 formed on the end of tubular member 103 and a box member 106 formed on the end of another tubular member 107. Either one or both of the tubular members 103, 107 define a longitudinal axis 14 (see FIGS. 8A or 9A) which is the longitudinal centerline of the connection 100. The box member 106 has an internal thread structure formed therein and is adapted to interengage a complementary external thread structure formed on pin member 102, for mechanically connecting tubular members 103 and 107 which form a part of a string of tubular pipe (not shown). Connection 100 further includes a center shoulder seal 104 located at approximately the longitudinal mid-point of connection 100. The external thread structure of the pin member 102 extends from its pin nose or leading terminal end 105 to a location 109 adjacent first center shoulder configuration 119 and then continues on the other side 111 of first center shoulder configuration 119 to the end of the external threads at the trailing terminal end 113 of connection 100. The complementary internal thread structure of the box member 106 extends from the box leading terminal end 115 to a location 117 adjacent second center shoulder configuration 108 and then continues at the other side 121 of second center shoulder configuration 108 to the end of the internal threads at trailing terminal end 123 of connection 100.

The center shoulder seal shown on connection 100 at 104, disposed between matched sets of connection threaded sections, prevents fluids (liquids or gases) from passing through (across the threads of) the connection. The preferred embodiments of the invention will be described as having a locked double shoulder center-shoulder seal, which will be described in detail subsequently. However, other center seal designs such as, for example, square shoulder, hook shoulder, square shoulder with frustrum seal, and annular shoulder can be used in the stabilized center-shoulder-sealed tubular connection of the present invention.

Referring again to FIG. 1, which illustrates embodiment one of the present invention, tubular connection 100, the center shoulder seal 104 is a locked double shoulder made up from a first center shoulder configuration 119 on pin member 102 and a second center shoulder configuration 108 on box member 106. The center-shoulder-seal-stabilizing thread sections (run-out thread sections) on each connection member are located on pin member 102 at 110 and on box member 106 at 114. With reference to pin member 102, run-out thread section 110, adjacent shoulder seal configuration 119, extends from position 109 adjacent seal configuration 119 to intersect full height tapered thread section 126 which extends to pin 102 leading terminal end 105. With reference to box member 106, run out thread section 114, adjacent shoulder seal configuration 108, extends from position 117 adjacent seal configuration 108 to intersect full height tapered thread section 128 which extends to box 106 leading terminal end 115. The complementary thread section which interengages run-out thread section 110 on pin member 102 is full height lead-in thread section 112 on box member 106. The complementary thread section which interengages run-out thread section 114 on box member 106 is full height lead-in thread section 116 on pin member 102. The full height lead-in thread sections 112 and 116 on box member 106 and pin member 102, respectively extend as full height thread sections 124 and 122, respectively, providing full height tapered threads to the end of these threaded sections at 123 and 113, respectively. The taper on threaded sections extending from leading terminal ends 105 and 115 of pin 102 and box 106, respectively, is slightly greater than the taper on threaded sections 112–124 and 116–122, which extend toward the trailing terminal ends 123 and 113 of box 106 and pin 102, respectively.

Upon assembly of connection 100, run-out thread section 110 of pin member 102 is interengaged with full height lead-in thread section 112 of box member 106 and full height thread section 126 of pin member 102 is interengaged with the full height thread section 124 of box member 106. Upon assembly of connection 100, run-out thread section 114 of box member 106 is interengaged with full height lead-in thread section 116 of pin member 102 and full height thread sections 128 of box member 106 interengage with full height thread section 122 of pin member 102.

Pin member 102 comprises a thread relief groove 118 between full height lead-in thread section 116 and first center-shoulder configuration 119. Corresponding box member 106 comprises a thread relief groove 120 between full lead-in thread section 112 and second center-shoulder configuration 108. The thread relief groove facilitates machining the full height lead-in threads 116, 122 on pin member 102 and 112, 124 on box member 106, and enables complete complementary engagement of any corresponding thread profile. Relief grooves 118, 120 also provide a depository for thread compound and ensure that there is no hydraulic lockup of the thread.

Helical full height thread sections 112–124 and 116–122 are machined on a constant taper relative to the longitudinal axis of connection 100. Helical full height thread sections 126 and 128 are also machined on a constant taper relative to longitudinal axis 14 of connection 100. However, the taper of these latter thread sections is greater than the taper of their corresponding member thread sections 112–124 and 116–122, respectively, to provide reduced stress at the terminal ends of connection 100 upon assembly. Thread sections 110 and 114 are run-out thread sections which are machined having thread crest construction lines parallel to longitudinal axis 14 of connection 100 and having thread root construction lines machined on the constant taper with respect to the longitudinal axis. However, individual crest surfaces and individual root surfaces typically are machined parallel to the connection longitudinal axis. It is possible to leave individual run-in truncated thread crests on a taper, but preferred to machine them to be parallel to the connection longitudinal axis.

Upon assembly, the interengaged connection 100 exhibits complete complementary engagement of run-out thread sections 110 and 114, each located on that side of center-shoulder seal 104 at which each connection member wall thickness is less, namely thin wall sections 130, 132, respectively. In addition, a slight interference fit is provided in the threads to assure maximized interengagement of the threads. In an interference fit, at corresponding engagement points on the pin and box members 102 and 106, the pin member 102 is machined slightly larger than the box member 106. Interference fit tapered threads are well established in the art. Complete complementary engagement of the run-out thread section provides a more efficient connection by completely using the available thread flank bearing surfaces, while simultaneously providing limitation of the stresses generated at the thin wall sections 130 on pin member 102 and 132 on box member 106. In addition, the run out thread sections at these locations on the pin and box members permit maintenance of maximum connection wall thickness in the areas, adjacent center shoulder 104, thereby providing a more efficient connection.

For purposes of illustration, embodiment one of the invention has been shown in FIG. 1 with a single hook thread profile having a negative load flank angle and a negative stab flank angle; the crests and roots of individual, threads are parallel to the connection longitudinal axis. Thread profiles other than a single hook can be used as well, as hereinafter described.

For purposes of comparison with the prior art, embodiment one of the present invention, in the structure of a +3 percent over pipe body diameter, formed-box slim line connection, exhibits an efficiency (strength of connection (joint)/strength of pipe) of about 85%, compared with the best known +3 percent formed box connection in the industry, which exhibits an efficiency of only about 75%. When the structure is a flush-joint connection, embodiment one of the present invention provides an efficiency of about 75% compared with the best known-in-the industry flush-joint connection efficiency of 65%.

Referring now to FIG. 2A, which illustrates embodiment two of the present invention connection, tubular connection 200 is made up from pin member 202 machined on the exterior end of tubular 203 and from box member 206 machined on the interior end of tubular 207. The center shoulder seal 204 of tubular connection 200 is a locked double shoulder configuration, formed from a first center shoulder configuration 2 19 on pin member 202 and from second center shoulder configuration 208 on box member 206.

FIG. 2B, which shows pin member 202, comprises run-out thread section 210 which extends from a location 209 adjacent first center shoulder configuration 219 on the thin-walled portion 230 of pin member 202 to thread section 226 of full height tapered thread which extends to leading end 205 of pin member 202. Pin member 202 also comprises run-in thread section 216 which extends from a location 211 adjacent first center shoulder configuration 219 on the thick-walled portion of pin member 202 to thread section 212 of full height tapered thread which extends to trailing end 213 of pin member 202.

FIG. 2C, which shows box member 206, comprises run-out thread section 214 which extends from a location 217 adjacent second center shoulder configuration 208 on the thin-walled portion 232 of box member 206 to thread section 228 of full height tapered thread which extends to leading end 215 of box member 206. Box member 206 also comprises run-in thread section 222 which extends from a location 221 adjacent second center shoulder configuration 208 on the thick-walled portion of box member 206 to thread section 224 of full height tapered thread which extends to trailing end 223 of box member 206.

Upon assembly of connection 200, run-out thread section 210 of pin member 202 interengages run-in thread section 222 of box member 206 and full height threads 226 of pin member 202 interengage full height threads 224 of box member 206. In addition, run-out thread section 2 14 of box member 206 interengages run-in thread section 216 of pin member 202 and full height thread section 228 of box member 206 interengages full height thread section 212 of pin member 202.

Helical full height thread sections 212 and 226 on pin member 202 and full height thread sections 224 and 228 on box member 206 are machined on a constant taper with respect to the longitudinal axis of connection 200, but having the individual surfaces of their roots and crests parallel to the longitudinal axis of connection 200. Run-out thread section 210 on pin member 202 has its minor diameter (roots) machined on a continuation of the constant taper of the minor diameter of adjacent full height thread section 226, while its major diameter (crests) is machined parallel to the connection 200 longitudinal axis. Run-in thread section 216 on pin member 202 has its minor diameter (roots) machined parallel to the connection 200 longitudinal axis, while its major diameter (crests) is machined as a continuation of the constant taper of the major diameter of adjacent full height thread section 212. Corresponding run-out and run-in thread sections of box member 206 are constructed in like manner, with the roots forming the major diameter and the crests forming the minor diameter.

Although sequential thread crests and roots are machined as described above, individual crest and root surfaces are typically machined parallel to the longitudinal axis of the connection. The exception to this is run-in thread sections, wherein the individual crest surfaces can be machined as a continuation of the constant taper of the major diameter of adjacent full height threads or can be machined parallel to the connection longitudinal axis. Individual crest surfaces machined parallel to the connection longitudinal axis are preferred. As with connection 100 shown in FIG. 1, the tapers of full height threaded sections 226 of pin 202 and 228 of box 206 are greater than the tapers of corresponding full height thread sections 224 of box 206 and 212 of pin 202, respectively.

Also, for purposes of illustration, embodiment two of the invention has been shown in FIG. 2 with a single hook thread profile having a negative load flank angle and a zero degree stab flank angle; however, other thread profiles can be used as well as hereinafter described.

In embodiment two, wherein a set of run-out, run-in thread sections is used adjacent each side of the center-shoulder seal 204, there is minimal unused (nonengaged) thread surface in the assembled thread sections. The connection 200 exhibits complete complementary engagement of the corresponding run-out and run-in thread section pairs, making these tapered threads highly efficient and providing even greater stabilization of the center-shoulder seal 204 than that provided in embodiment one shown in FIG. 1.

For comparison purposes with the prior art, embodiment two of the present invention shows approximately the same improvement in efficiency over the known prior art as that exhibited by embodiment one shown in FIG. 1.

Referring now to FIG. 3A, which illustrates embodiment three of the present invention connection, tubular connection 300 is made up from pin member 302 machined on the exterior end of tubular 303 and from box member 306 machined on the interior end of tubular 307. The center shoulder seal 304 of tubular connection 300 is a locked double shoulder configuration, formed from first center shoulder configuration 319 on pin member 302 and from second center shoulder configuration 308 on box member 306.

FIG. 3B, which shows pin member 302 comprises run-out thread section 310 which extends from a location 309 adjacent first center shoulder configuration 319 on the thin-walled portion 330 of pin member 302 to thread section 326 of full height tapered thread, which extends to run-in thread section 334 which extends to leading end 305 of pin member 302. Pin member 302 also comprises run-in thread section 316 which extends from a location 311 adjacent first center shoulder configuration 319 on the thick-walled portion of pin member 302 to thread section 312 of full height tapered thread, which extends to run-out thread section 336 which extends to trailing end 313 of pin member 302.

FIG. 3C, which shows box member 306, comprises run-out thread section 314 which extends from a location 317 adjacent second center shoulder configuration 308 on the thin-walled portion 332 of box member 306 to thread section 328 of full height tapered threads, which extends to run-in thread section 338 which extends to leading end 315 of box member 306. Box member 306 also comprises run-in thread section 322 which extends from a location 321 adjacent second center shoulder configuration 308 on the thick-walled portion of box member 306 to thread section 324 of full height tapered thread, which extends to run-out thread section 340 which extends to trailing end 323 of box member 306.

Upon assembly of connection 300, run-out thread section 310 of pin member 302, interengages run-in thread section 322 of box member 301, full height thread section 326 of pin member 302 interengages full height thread section 324 of box member 306, and run-in thread section 334 of pin member 302 interengages run-out thread section 340 of box member 306. In addition, run-out thread section 314 of box member 306 interengages run-in thread section 316 of pin member 302, full height thread section 328 of box member 306 interengages full height thread section 312 of pin member 302, and run-in thread section 338 of box member 306 interengages run-out thread section 336 of pin member 302.

Helical full height thread sections 312 and 326 on pin member 302 and 324 and 328 on box member 306 are on a constant taper with respect to the longitudinal axis of connection 300, but having the individual surfaces of their roots and crests parallel to the longitudinal axis of connection 300. Run-out thread sections 310 and 336 on pin member 302 and run-out thread sections 314 and 340 on box member 306 have their roots machined on a continuation of the constant taper of the adjacent full height thread sections. Run-out thread sections 310 and 336 on pin member 302 and run-out thread sections 314 and 340 on box member 306 have their crests machined parallel to the longitudinal axis of connection 300. Run-in thread sections 316 and 334 on pin member 302 and run-in thread sections 322 and 338 on box member 306 have their roots machined parallel to the longitudinal axis of connection 300, while their crests are machined on a continuation of the constant taper of the respective major or minor diameter of the adjacent full height thread sections.

Embodiment three of the invention shown in FIG. 3 exhibits a double hook thread profile; however, other thread profiles can be used as well, as hereinafter described.

This double set of run-out and run-in threads (one set adjacent the center-shoulder seal 304 and a second set at the terminal ends of connection 300) provides maximum joint efficiency and maximum stability for center-shoulder seal 304 of the connection 300. The double set of run-out and run-in threads also provides the smoothest load transfer between pin and box members 302, 306, respectively, thereby not only increasing the connection's rated load capacity but also its overload capacity (i.e., safety factor).

For comparison purposes with the prior art, embodiment three of the present invention, in the structure of a +3.5 percent over pipe body diameter, formed box slim line connection exhibits an efficiency (strength of connection (joint)/strength of pipe) of about 95%. When the structure is a 3 percent formed box connection, the efficiency decreases to about 90%. The best known-in-the-industry +3 percent formed box connection provides only a 75% efficiency.

Regarding the above-described embodiment three of the present invention, in the structure of a flush outside diameter connection, the efficiency provided is about 77%. The best known-in-the-industry flush connection provides only a 65% efficiency.

Referring now to FIG. 4A, which illustrates embodiment four of the present invention connection, tubular connection 400 is made up from pin member 402 machined on the exterior end of tubular 403 and from box member 406 machined on the interior end of tubular 407. The center shoulder seal 404 of tubular connection 400 is a locked double shoulder configuration, formed from first center shoulder configuration 419 on pin member 402 and from second center shoulder configuration 408 on box member 406.

FIG. 4B, which shows pin member 402 comprises run-out thread section 410 which extends from a location 409 adjacent first center shoulder configuration 419 on the thin-walled portion 430 of pin member 402 to thread section 426 of full height tapered thread, which extends to run-in thread section 434 which extends to leading end 405 of pin member 402. Pin member 402 also comprises run-in thread section 416 which extends from a location 411 adjacent first center shoulder configuration 419 on the thick-walled portion of pin member 402 to thread section 412 of full height tapered thread, which extends to run-out thread section 436 which extends to trailing end 413 of pin member 402.

FIG. 4C, which shows box member 406, comprises run-out thread section 414 which extends from a location 417 adjacent second center shoulder configuration 408 on the thin-walled portion 432 of box member 406 to thread section 428 of full height tapered threads, which extends to run-in thread section 438 which extends to leading end 415 of box member 406. Box member 406 also comprises run-in thread section 422 which extends from a location 421 adjacent second center shoulder configuration 408 on the thick-walled portion of box member 406 to thread section 424 of full height tapered thread, which extends to run-out thread section 440 which extends to trailing end 423 of box member 406.

The principal difference between this fourth embodiment of the invention and the third embodiment illustrated in FIG. 3 lies in the thread profile. The thread profile of this fourth embodiment is a specialized self-centering thread profile wherein the stab flank of all full-height threads is chamfered, as shown in FIG. 7 and described in detail subsequently with reference to FIG. 7. Thus, each stab flank of full-height thread sections 412 and 426 of pin member 402 and each stab flank of full-height thread sections 424 and 428 of box member 406 is chamfered. The chamfer width (axial distance) is preferably about 0.005 inches or less and the chamfer height (perpendicular to the connection or member longitudinal axis) is approximately equal to the step height (height of the stab flank minus the height of the preceding thread load flank). Presence of this chamfer on the stab flank of all full-height threads on both pin member 402 and box member 406 results in a self-centering action upon assembly of connection 400; in particular, the self-centering action occurs during the initial telescoping (stabbing) of pin member 402 into box member 406.

Upon initial assembly of connection 400, after initial telescoping, the stab flanks of pin member 402 threads come to rest on the stab flanks of box member 406 with the chamfered portion of the stab flanks providing the self-centering action described above. Upon completion of assembly, to power tight position, run-out thread section 410 of pin member 402, interengages run-in thread section 422 of box member 401, full height thread section 426 of pin member 402 interengages full height thread section 424 of box member 406, and run-in thread section 434 of pin member 402 interengages run-out thread section 440 of box member 406. In addition, run-out thread section 414 of box member 406 interengages run-in thread section 416 of pin member 402, full height thread section 428 of box member 406 interengages full height thread section 412 of pin member 402, and run-in thread section 438 of box member 406 interengages run-out thread section 436 of pin member 402. At power tight position, the load flanks, roots and crests of full-height threads of each member are in sufficient contact to provide sealing engagement, while the stab flanks of these threads exhibit a slight clearance (typically about 0.002 inches).

Helical full height thread sections 412 and 426 on pin member 402 and 424 and 428 on box member 406 are machined on a constant taper with respect to the longitudinal axis of connection 400, but having the individual surfaces of their roots and crests parallel to the longitudinal axis of connection 400. Run-out thread sections 410 and 436 on pin member 402 and run-out thread sections 414 and 440 on box member 406 have their sequential roots machined on a continuation of the constant taper of the adjacent full height thread sections. Run-out thread sections 410 and 436 on pin member 402 and run-out thread sections 414 and 440 on box member 406 have their sequential crests machined parallel to the longitudinal axis of connection 400. The individual root and crest surfaces of run-out thread sections are machined parallel to the connection longitudinal axis. Run-in thread sections 416 and 434 on pin member 402 and run-in thread sections 422 and 438 on box member 406 have their sequential roots machined parallel to the longitudinal axis of connection 400, while their sequential crests are machined on a continuation of the constant taper of the respective major or minor diameter of the adjacent full height thread sections. Although the individual root surfaces of these run-in thread sections are machined parallel to the connection (connection member) longitudinal axis, the individual crests can be machined either on a taper or parallel to the connection longitudinal axis, as previously discussed with reference to run-in thread sections.

Embodiment four of the invention, shown in FIG. 4 exhibits a thread profile having a chamfered stab flank with a positive stab flank angle of less than about 2 degrees, with reference to a line perpendicular to the preceding individual thread root (and the connection longitudinal axis). The load flank angle is a negative angle of about 3 degrees or less. In the most preferred embodiment of the invention, the stab flank angle is zero degrees and the load flank angle is a negative angle of about 3 degrees.

The efficiency of the connection illustrated in FIG. 4 is essentially the same as that of the connection illustrated in FIG. 3.

FIG. 5A is an enlarged view of a center-shoulder seal 500 which is shown in embodiment one of FIG. 1. Assembled center shoulder seal 500 is a locked double shoulder seal made up from first center shoulder configuration 510 on pin member 514 and from second center shoulder configuration 530 on box member 534. Thread relief groove 512 on pin member 514 and thread relief grooves 532 on box member 534 are made necessary by the use of full height lead-in threads 526 on pin member 514 and full height lead in threads 546 on box member 534, respectively. When full height lead-in threads are not used, for example in embodiments two, three or four (as illustrated by connections 200, 300 and 400), use of thread relief grooves is optional. The thread profile shown in FIG. 5A is a preferred double hook of the kind shown in FIG. 6D.

Figure 5C:
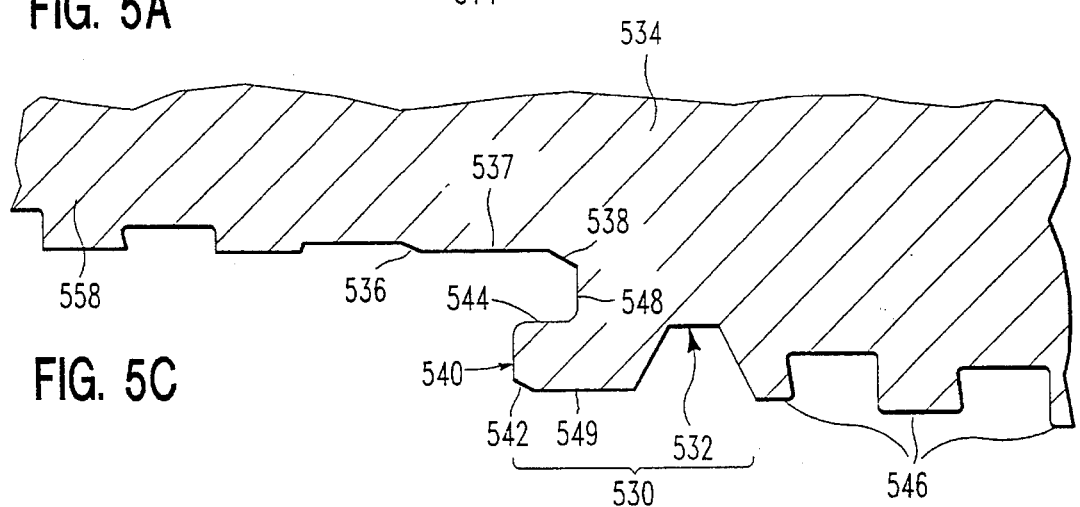
FIG. 5C shows a schematic of a longitudinal cross-sectional view of the box member shown in FIG. 5A.
Figure 5B:
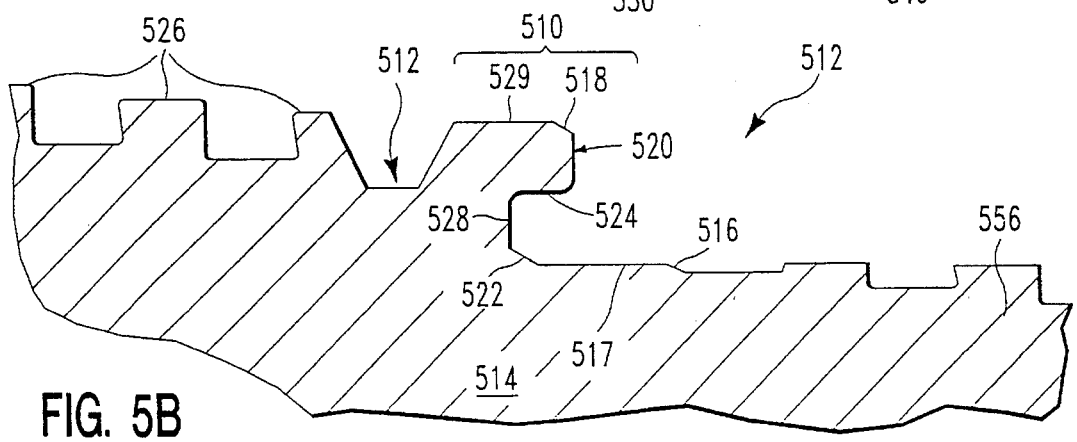
FIG. 5B shows a schematic of a longitudinal cross-sectional view of the pin member of FIG. 5A.

FIGS. 5B and 5C show first center shoulder configuration 510 of pin member 514 and second center shoulder configuration 530 of box member 534, respectively. Each connection member comprises a ramp, 516 on pin 514 and 536 on box 534. Connection pin member 514 center shoulder configuration 510 comprises shoulder 520 having first undercut surface 528, first sealing surface 518 and fourth sealing surface 522. Connection box member 534 center shoulder configuration 530 comprises shoulder 540 having second undercut surface 548, second sealing surface 542 and third sealing surface 538.

Upon assembly of center shoulder seal 500, first sealing surface 518 on shoulder 520 of pin configuration 510 is lined up by and guided into position on corresponding first ramp 536 of box center shoulder configuration 530. Simultaneously, second sealing surface 542 on shoulder 540 of box center shoulder configuration 530 is lined up by and guided into position on corresponding second ramp 516 of pin center shoulder configuration 510. As the assembly progresses, a metal-to-metal seal is created as first sealing surface 518 on shoulder 520 moves into place against third sealing surface 538 on box center shoulder configuration 530. Simultaneously, a metal-to-metal seal is created as second sealing surface 542 on shoulder 540 moves into place against fourth sealing surface 522 on pin center shoulder configuration 510. As shoulders 520 and 540 move into position, typically they begin to bend slightly, closing the gap between surface 524 on first center shoulder configuration 510 and surface 544 on second center shoulder configuration 530, thereby producing a zero clearance, metal-to-metal surface seal between at least a portion of surfaces 524 and 544. This latter metal-to-metal seal will not occur if there is substantial (greater than 0.005 in.) clearance between surface 524 and surface 544 prior to the above-described bending action.

Upon final power tightening (torquing) of the assembled connection, the leading surface of shoulder 520 contacts first undercut surface 548 on box center shoulder configuration 530, while the leading surface of shoulder 540 contacts second undercut surface 528 on pin center shoulder configuration 500, thereby creating two additional zero clearance, metal to metal sealing surfaces.

Thus, a total of at least four (4) and possibly five (5) metal-to-metal seals are created during assembly (make-up) of the connection: two metal-to-metal seals at the exterior beveled edges of the locked double shoulder seal 500 where sealing surfaces 518 and 538 are in contact and where sealing surfaces 522 and 542 are in contact; and, three zero clearance, metal to metal sealing surfaces at the interior of the locked double shoulder seal 500, one at the wall surface where sealing surfaces 524 and 544 contact, another zero clearance surface where the face surface of pin shoulder 520 contacts box undercut surface 548, and another zero clearance surface where the face surface of box shoulder 540 contacts pin undercut surface 528. Thus, center-shoulder seal 500 forms multiple metal-to-metal seals, having mating metal-to-metal sealing surfaces which allow a build-up of stored energy within the seal upon power tightening of the assembled connection, such that upon the application of various loads on the pipe and also the connection, the seal will continue to perform and maintain sealing engagement.

Typically a thread compound will be used on the surfaces of the threaded connection and this thread compound will bridge any surface defects and clearances less than about 0.005 inches, to provide an improved sealing capability. Such a thread compound will assist the intended metal-to-metal, zero clearance seals described above should surface defects or machining tolerances result in a clearance between metal surfaces of less than about 0.005 inches. A thread compound can also provide a hydraulic seal between surfaces which do not exhibit zero clearance after power tight make-up of the connection. For example, hydraulic seals can be provided between surfaces 529 of pin 514 and 537 of box 534 as well as between surfaces 517 of pin 514 and 549 of box 534 using thread compound. Additional hydraulic seals can be provided for each step of connection threads, since the thread surfaces which do not exhibit metal-to-metal contact are close fit surfaces which can be bridged using thread compound.

A description of the location and dimensions of the present invention locked double shoulder center seal relative to the cross-sectional area of the connection follows. It is desirable to balance the cross-sectional areas of the tubular walls which make up the connection in the area of the locked double shoulder seal, thus providing a more efficient connection. The formula which follows permits calculation of the preferred diameter of a circle formed by the radial center of the locked double shoulder seal (radial center relative to the longitudinal axis of the connection). This preferred diameter is essentially equal to the connection outside diameter squared plus the connection inside diameter squared minus the constant k, all divided by two, with the square root being taken of the result. The constant k is equal to two times the squared height of interlocked shoulders 520 and 540. As shown on FIG. 5A, the radial center of the locked double shoulder seal is located at contacting surfaces 524 and 544 of shoulder 520 and shoulder 540, respectively. The height of interlocked shoulders 520 and 540 is dimension 552. The minimum height 552 of interlocked shoulders 520 and 540 is a function of the wall thickness of the tubular (pipe) used to form the connection. Typically the radial height 552 of interlocked shoulders 520 and 540 is two to three times the longitudinal width, dimension 554 on FIG. 5A, of shoulders 520 and 540. In addition, the height 552 of the cross section of interlocking shoulders 520 and 540 is typically ¼ to ⅓ of the tubular member (pipe) wall thickness.

The connection of the present invention establishes a constant bearing force on the various seals provided by the center-shoulder seal 500. Not only do the curving edges of locked double shoulder seal 500 at 518,538 and 522, 542 interferingly engage to form a metal-to-metal seal, but upon power tightening of the connection, the facing surface of shoulder 520 in contact with undercut surface 548 and the facing surface of shoulder 540 in contact with undercut surface 528 are loaded and the annular contact between surfaces 524 and 544 typically establishes a seal due to a bending reaction on the shoulders from the seal 518 contacting seal 538 and seal 542 contacting seal 522 and from the Poisson's effect of the metal upon final power tightening.

Other center shoulder designs which are known in the art can also be stabilized using the adjacent run-out, run-in thread section constructions described above. Examples of other center seal designs which can be stabilized include, not by way of limitation, square shoulders; hook shoulders (wherein the shoulder exhibits at least one negative angle relative to the connection longitudinal axis); square shoulders with a frustum seal; annular shoulders (shoulder on a taper with the connection longitudinal axis); shoulders comprising grooves or an annulus having an axial undercut which employ a sealing sleeve, ring or annulus; and shoulders designed to extrude a portion of their mass laterally into adjacent grooves upon assembly of the connection.

FIGS. 6A through 6D illustrate four preferred thread profiles for use in combination with the other features of connections of the present invention.

For convenience and accuracy of description, the following geometric conventions will be used in describing the angles of the load and stab flanks of the threads of the present invention. The angle α represents the stab flank angle and the angle β represents the load flank angle of the threads. These angles are defined in geometric terminology with reference to a line constructed perpendicular to the longitudinal axis of the connection (tubular) and at the root of the thread flank. A degree of a negative flank angle is the rotation, in degrees, of the perpendicular line in the counterclockwise direction to meet the thread flank. A degree of positive flank angle is the rotation in degrees of the perpendicular line in the clockwise direction to meet the thread flank. These conventions for defining stab and load flank angles do not necessarily comport with the general conventions used in machining pipe threads.

Figure 6A:
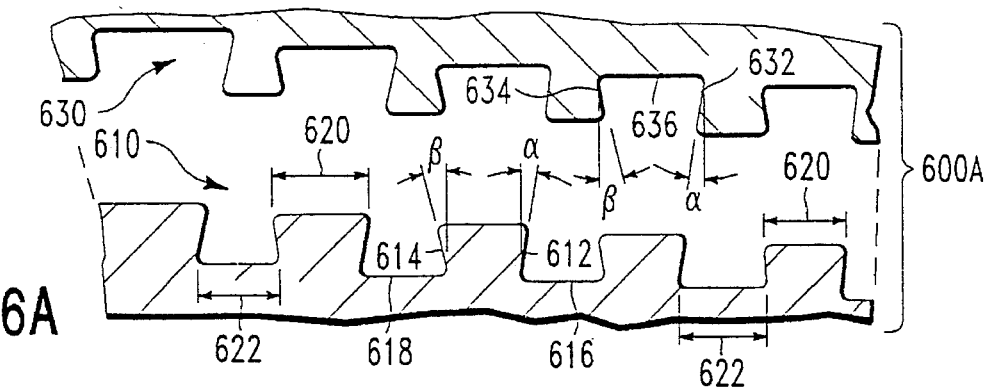
FIG. 6A shows a schematic of a longitudinal cross-sectional view of a portion of a section of double hook thread profile of the present invention having a negative load flank angle and a positive stab flank angle.

FIG. 6A illustrates corresponding pin 610 and box 630 cross-sectional profiles for a portion of full height double hook thread 600A. The double hook thread exhibits a negative load flank angle β and a positive stab flank angle α. The thread profile of full height threads from a portion of pin member 610 is shown as it would appear within a threaded tubular section of the present invention. Stab flank 612 forms a positive stab flank angle α with respect to a line perpendicular to root wall 616, which is parallel to the connection longitudinal axis 14, and load flank 614 forms a negative load flank angle β with respect to a line perpendicular to root wall 618, which is parallel to the connection longitudinal axis.

The thread profile of full height double hook threads from a portion of box member 630 is shown as it would appear within a threaded tubular section of the present invention. For example, in a manner similar to the pin thread, stab flank 632 forms a positive angle α with respect to a line perpendicular to root wall 636, and load flank 634 forms a negative angle β with respect to a line perpendicular to root wall 636. To permit interengagement of the double hook threads of pin member 610 with the double hook threads of box member 630, it is necessary that the thread width be constantly increasing from the leading edge (edge initially telescoped into the box member) of pin member 610, and that the thread width be constantly decreasing (the root width be constantly increasing) from the corresponding edge of box member 630, as shown in FIG. 6A. Thus, the thread profile crest widths 620 of pin member 610 are progressively lengthened, while the thread root widths 622 are progressively narrowed, with the reverse occurring on box member 630. One method of producing threads with such dimensions is to machine the thread stab flanks with a slightly greater (longer) lead than the load flanks. The amount of lead increase (ΔL) required to permit the threads to mesh (interengage) upon telescoping (stabbing) is a function of the thread taper (T) and the stab and load flank angles (α and β, respectively), and can be calculated according to the following formula:

$$\Delta L = \tfrac{1}{2} T (\tan |\alpha| + \tan |\beta|)$$

When there is more than one step of threads in the connection (for example, a two step thread wherein one section of threads is followed by a center-shoulder seal, followed by a second section of threads located at a greater axial distance from the longitudinal axis of the connection), the thread width can be constantly increasing from the leading edge of the pin member all of the way to the end of the connection; or, alternatively and preferably, the thread width is increased progressively within each step of threads, beginning with the minimum width thread at the pin leading edge step of threads and the minimum width thread beginning again at the forward edge of the second step of pin threads.

The preferred double hook thread, in terms of mechanical performance, exhibits a positive stab flank angle and a negative load flank angle, the absolute sum of which (without regard to sign on the angle) ranges from about 5 degrees to about 20 degrees. Typically, the negative load flank angle does not exceed about 8 degrees and the positive stab flank angle does not exceed about 4 degrees. However, in terms of ease of machining and minimizing the lead adjustments, $\Delta L$, the absolute sum of the positive stab flank angle and negative load flank angle should range from slightly greater than 0 degrees to less than 5 degrees, with the negative load flank angle ranging from about 1 degree to about 4 degrees. When this reduced absolute sum of load and stab flank angles is used, it is not necessary to use constantly increasing thread width to permit interengagement of connection member threads. Preferably the load flank angle is a larger (greater) absolute angle than the stab flank angle, since for thread profiles having crests and roots which are parallel to the connection longitudinal axis, the load flank length is less than the stab flank length, as can be observed in viewing load flank 614 and stab flank 612. Also, when the connection is operating under the most severe service conditions, the thread load flanks experience a greater applied force than the stab flanks.

Figure 6B:
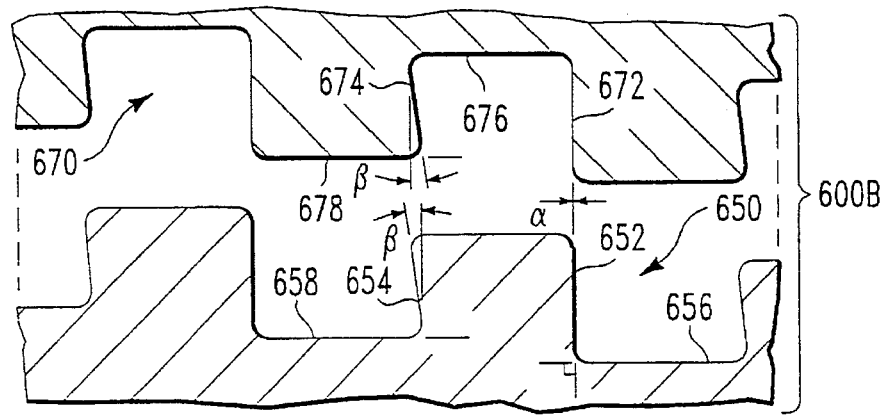
FIG. 6B shows a schematic of a longitudinal cross-sectional view of a single hook thread profile of the present invention having a negative load flank angle and zero degree (fight angle) stab flank.

FIG. 6B illustrates corresponding pin 660 and box 670 cross-sectional profiles of one embodiment of single hook thread, 600B. The thread profile of full height threads from a portion of pin member 650 is shown as it would appear within the threaded tubular section of the present invention. The distinguishing feature of this embodiment of single hook thread is that its stab flank 652 exhibits a zero degree angle $\alpha$ with respect to a line perpendicular to both the connection longitudinal axis and the thread root wall, while its load flank 654 exhibits a negative angle $\beta$ with respect to a line perpendicular to both the connection longitudinal axis and the thread root wall. For example, referencing the thread profile of pin member 650, stab flank 652 forms a right angle with reference to the connection longitudinal axis, or zero degree angle $\alpha$ with respect to a line perpendicular to root wall 656, while load flank 654 forms negative angle $\beta$ with respect to a line perpendicular to root wall 658. In a corresponding manner, referencing the thread profile of box member 670, stab flank 672 forms a zero degree angle $\alpha$ with a line perpendicular to root wall 676, while load flank 674 forms a negative angle $\beta$ with a line perpendicular to root wall 676.

The single hook thread exhibits a negative stab flank angle which ranges from zero (0) degrees to about 45 degrees, and exhibits a negative load flank angle which ranges from greater than 0 degrees to about 15 degrees. If the load flank angle is a large negative angle, and the stab flank angle is less than the load flank angle, thereby producing thread crests wider than adjacent thread roots, the use of a constantly increasing thread width from the leading edge of the pin, as described above for a double hook thread, may be necessary to permit proper interengagement of the pin and box members of the connection upon initial telescoping (stabbing).

A more preferred single hook thread profile, due to ease of machining, is the profile wherein the negative load flank angle ranges from greater than 0 degrees to less than 5 degrees and the negative stab flank angle ranges from zero degrees to about 2 degrees, with the absolute sum of the angles being less than 5 degrees. When these reduced negative load flank and stab flank angles are used, it is not necessary to use constantly increasing thread width to permit interengagement of connection member threads. The necessary clearance is provided by making the thread crests narrower than the thread roots.

Figure 6C:
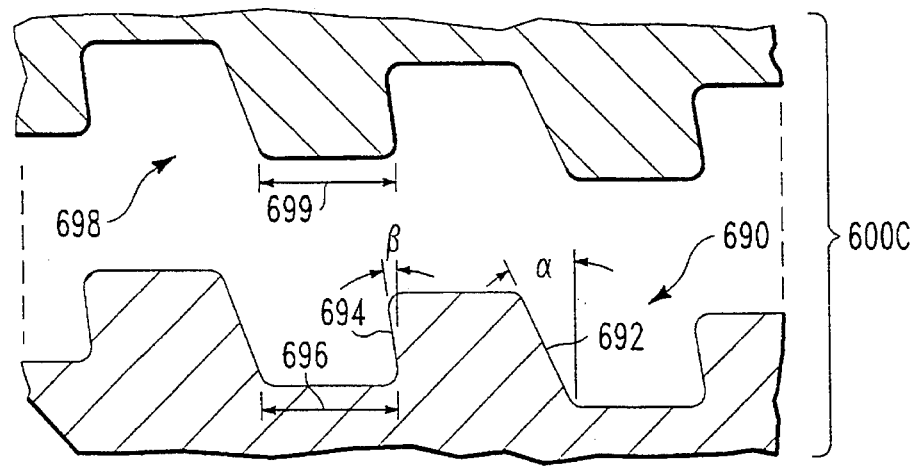
FIG. 6C shows a schematic of a longitudinal cross-sectional view of a conventional single hook thread profile of the present invention having a negative load flank angle and a negative stab flank angle.

FIG. 6C illustrates another thread profile embodiment 600C suitable for use in the connection of the present invention. This thread profile is particularly suitable for a connection having a center-shoulder seal (such as the locked double shoulder) in combination with a single run-out thread and full height lead-in thread on the corresponding member, on each side of the center-shoulder seal. The thread profile of full height threads from a portion of the pin member 690 is another embodiment of a single hook thread as it would appear within the threaded tubular section of the present invention. This particular embodiment of a single hook thread features a load flank 694 of pin member 690 thread which exhibits a large negative angle $\beta$ and a stab flank 692 which exhibits a large negative angle $\alpha$. Generally, angle $\alpha$ is greater than angle $\beta$, and consequently, dimensions can be formulated with flank to flank (load to stab) beating threads, having clearance between thread roots and crests, for example, with clearance between root 696 of pin member 690 and crest 699 of box member 698. This is in contrast with the double hook thread of FIG. 6A and the single hook thread of 6B, which are more suitable in a form wherein the thread roots and crests provide bearing surfaces with clearances between corresponding stab and load flanks. Flank to flank bearing threads of the kind shown in FIG. 6C can be used to modify the interference in the run-out section of threads.

The angles of the single hook thread profile shown in 6C typically are such that the negative load flank angle ranges from about 5 degrees to about 15 degrees and the negative stab flank angle ranges from about 5 degrees to about 35 degrees, with the stab flank angle being larger than the load flank angle by about 10 to 15 degrees.

Figure 6D:
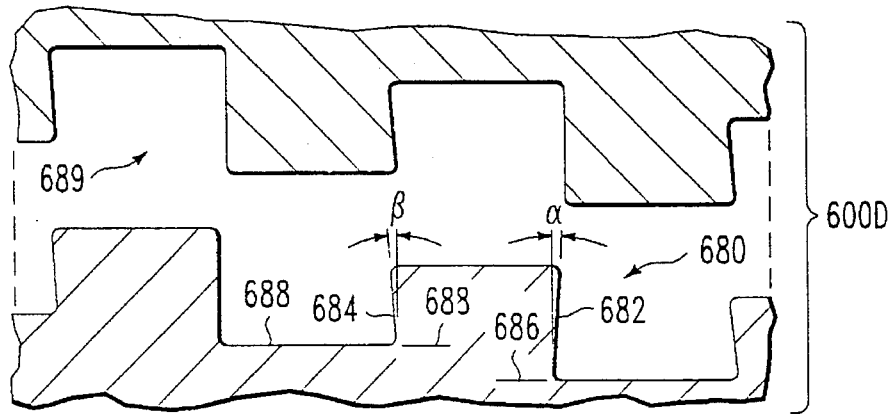
FIG. 6D shows a schematic of a longitudinal cross-sectional view of a preferred double hook thread profile of the present invention having a negative load flank angle and a stab flank angle which is slightly positive, approaching zero degrees.

FIG. 6D illustrates cross sectional profiles of a preferred double hook thread 600D. The preferred double hook thread exhibits a positive stab flank angle $\alpha$ ranging from nearly a zero degree angle to an angle of less than 2 degrees, and a load flank angle $\beta$ which has been reduced to a small negative angle, ranging from nearly a zero degree angle to an angle of less than 5 degrees, with the absolute sum of the flank angles being less than 5 degrees. The thread profile of full height threads from a portion of pin member 680 is shown as it would appear within a threaded tubular section of the present invention. The distinguishing feature of the preferred double hook thread is that both its positive angle stab flank 682 and its negative angle load flank 684 exhibit a nearly zero degree angle with respect to a line perpendicular to the connection longitudinal axis and the thread root wall. For example, stab flank 682 forms an angle $\alpha$ which ranges from a right angle with reference to the connection longitudinal axis, up to a positive angle of less than 2 degrees with a line perpendicular to root wall 686; and, load flank 684 forms an angle $\beta$ which ranges from a near fight angle with reference to the connection longitudinal axis, up to a negative angle of less than 5 degrees with a line perpendicular to root wall 688. Corresponding box member 689 thread exhibits the same ranges of stab flank angle and load flank angle ranges as those just described. It is not necessary to use progressively increasing thread width to permit connection member thread interengagement (proper meshing after stabbing) when a preferred double hook thread profile of the kind shown in FIG. 6D is used. This thread profile is essentially a modified square thread.

The most preferred thread profile for use in the present invention is one having a negative load flank angle and a zero degree or positive stab flank angle with a chamfered stab flank, which provides self-centering action upon initial telescoping of connection members. Typically a single hook thread profile (to which this thread profile is similar) requires a variable width thread to permit proper interengagement of the threads. FIGS. 7A–7C illustrate a thread profile having a negative load flank angle and a zero degree, chamfered stab flank in combination with a variable width thread. The thread profile of pin member 750 comprises a load flank 754 having a negative angle, β, and a chamfered stab flank 702 having a zero degree angle, α; the chamfer 756 exhibits a width, ω, and a chamfer degree, η, is a function of thread pitch and taper. The height 758 of chamfer 756 is approximately equal to or less than the height of stab flank 752 minus the height of the preceding load flank 754, or the "step height." The thread profile of box member 770 comprises a load flank 774 having a negative angle, β, and a chamfered stab flank 772 having a zero degree angle, α; the chamfer 776 exhibits a width, ω, and a chamfer degree, η, with a chamfer height which is the same as the chamfer height of pin member 750. Box member 770 chamfer width, degree, and height are determined in the manner described for the corresponding pin member 750, with the chamfer degree being a function of thread width and taper and the resulting chamfer height being approximately equal to or less than the step height. An increased chamfer height provides increased self-centering action and is preferred; however, a chamfer height greater than the step height provides no advantage. A chamfer width, ω, of less than 0.005 inches is preferred.

In sizing the connection of the present invention, the location of the radial centerline of the center-shoulder seal is determined with reference to the outside and inside diameters of the pipe. The fade out point of the connection thread sections is determined by the minimum required wall thickness at the terminal ends of the connection. The length of a thread section is a function of the angle of taper of the threads and the change in diameter of the thread. Since the thread sections on each side of the center-shoulder seal should bear approximately one-half of the load on the connection, the amount of engaged thread length may be calculated to ensure that the threads do not shear off under load. Knowing these parameters, one skilled in the art can then determine the thread taper.

Figure 8A:
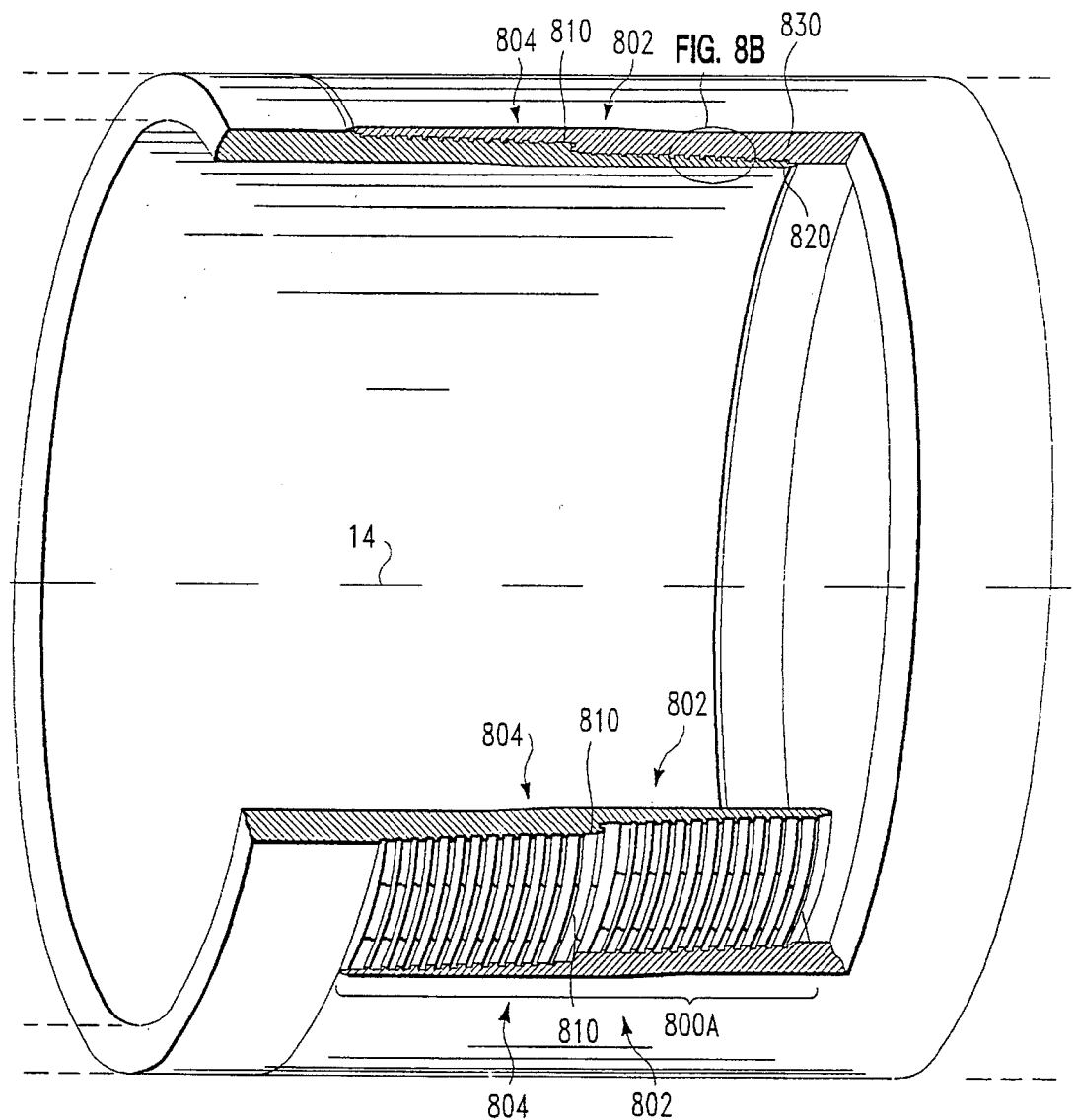
FIG. 8A shows a schematic of a longitudinal cross-sectional view of the assembled connection of FIG. 2, but with the thread having the double hook thread profile shown in FIG. 5A, and having different leads in the load and stab flanks, thereby producing a variable thread crest/root width on each thread.

FIG. 8A illustrates an assembled tubular connection 800A of the present invention. Connection 800A includes a set of run-out, run-in threads, set 802 and set 804, on each side of a center-shoulder seal 810, which is shown as a locked double shoulder configuration. The thread profile shown is a double hook which is shown enlarged on a portion of pin member 820 and box member 830 in FIG. 8B. Double hook threads having a positive stab flank angle α and a negative load flank angle β, the absolute sum of which is greater than about 8 degrees, require variable, constantly increasing thread crest width (i.e., a lead adjustment between the stab and load flanks) for proper meshing of the flanks, after the threads are telescoped, during hand tight make up. The use of variable width threads permits clearances between flanks in an assembled connection to be kept at a minimum (typically no more than about 0.003 inches). Thus, when a thread compound containing particulate matter is used during assembly of the connection, an additional seal can be formed between thread flanks due to the bridging action of the particles between flank clearances. Generally, such a seal can be formed only if the flank clearances are less than about 0.005 inches.

Figure 8B:
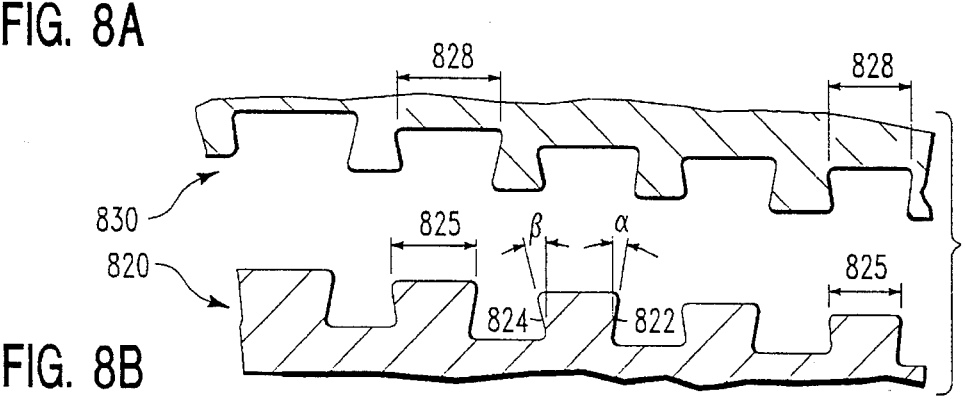
FIG. 8B shows a schematic of a longitudinal cross-sectional view of a portion of the double hook threaded profile of the pin and box members shown in FIG. 8A.

FIG. 8B shows portions of pin member 820 and box member 830, respectively. Stab flank 822 of pin member 820 exhibits a positive angle α of about 5 degrees, for example, and load flank 824 exhibits a negative angle β of about 8 degrees, for example. The variable width full height thread profile shown on the portion of pin member 820 exhibits increasing crest width 825 which corresponds with the variable decreasing width thread on box member 830, which exhibits increasing root width 828.

When double hook threads having constant width crests and roots (not shown) are used in the connection of the present invention, a greater flank clearance (above 0.005 inches, depending on the design) is required, making sealing at the thread flanks uncertain. This creates a potential for fluid leakage across the threads. Consequently, either the preferred double hook thread profile wherein the absolute sum of the flank angles is less than 8 degrees or a conventional single hook thread profile must be used to achieve thread sealing when the thread profile exhibits constant width crests and roots.

FIG. 9 illustrates another embodiment of an assembled tubular connection 900A of the present invention. Connection 900A includes a double set of run-out, run-in threads, set 902 and set 904, adjacent center-shoulder seal 910 combined with a second set of run-out, run-in threads, set 906 and set 908, adjacent the terminal ends of the connection. Preferably center-shoulder seal 910 is a locked double shoulder configuration. Connection 900A is shown with a single hook thread profile, having a chamfered stab flank.

As shown in FIG. 9B–9D the thread profile of a portion of pin member 950 includes a single hook thread having a stab flank 952 exhibiting a fight angle with reference connection 900A longitudinal axis 14 (or a 0 degree angle α with reference to a line perpendicular to the longitudinal axis and to and root wall 966, and having a load flank 954 exhibiting a negative angle β with respect to a line perpendicular to the connection longitudinal axis 14 and thread root wall 968. The negative load flank angle β is preferably in the range from about 1 degree to about 10 degrees. The thread profile of box member 970 is complementary to that of pin member 950.

Figure 9A:
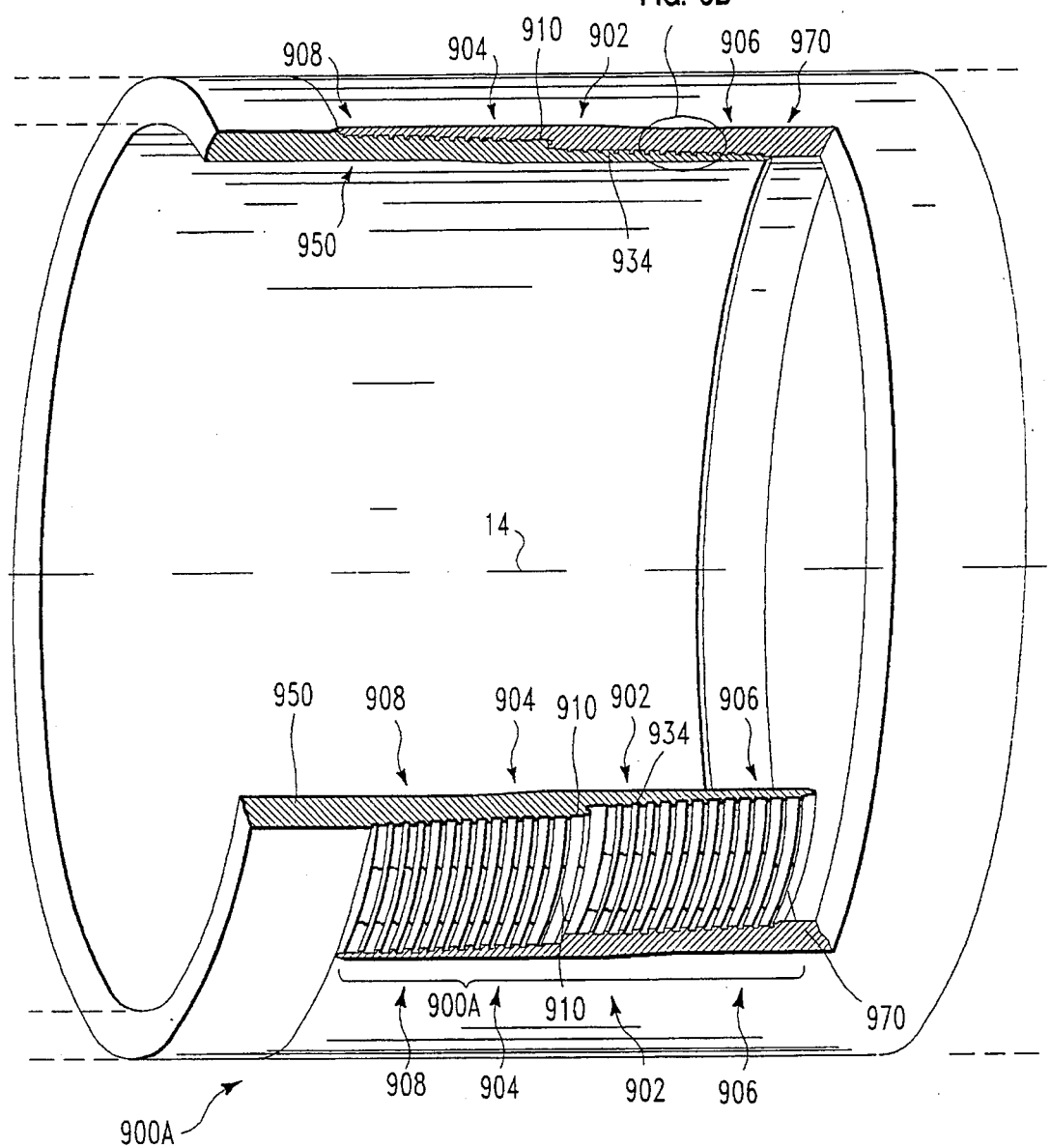
FIG. 9A shows a schematic of a longitudinal cross-sectional view of the assembled connection of FIG. 3, but with the thread having the single hook thread profile.

The most preferred embodiment of the present invention is connection 900A shown in FIGS. 9A–9D which utilizes a double set of run-out, run-in thread sections and a locked double shoulder center seal, but having a variable width thread with a single hook thread profile including a chamfered stab flank, as shown in FIGS. 9B–9D. This embodiment provides the smoothest flow of forces between the pin member 950 and box member 970; provides high tension efficiency; and, also provides excellent sealing engagement for preventing fluid penetration into the threads and through (across the threads of) the connection. The negative load flank of the single hook thread causes the two thread zones on each side of the center-shoulder seal move as a unit, and the chamfered stab flank provides self-centering action during initial telescoping of the pin member 950 into the box member 970.

The run-out, run-in thread sections of the present invention fade in the thread load gradually and then fade out the thread load gradually. Full height threads like those typically used in the prior art cause the thread load to abruptly increase, thereby transferring a large force abruptly, which in turn caused undesirable bending moments within the connection.

The tension efficiency of a connection depends upon the extent to which the pin and box member are formed. Generally, the more forming, the greater the efficiency which can be achieved. Thus, greater efficiencies may be achieved in slim line connections which may have up to a 3.5% greater outside diameter than that of the tubular pipe than can be achieved in flush joint connections which have the same outside diameter as the pipe.

The double set of run-in, run-out threads of connection 900A is preferred since this provides maximum utilization of available pipe wall without the waste of space in the form of clearances and gaps in the threads for which there is no complementary engagement. Further, it is desirable not to have wasted space in the form of relief grooves, cut-outs, or other metal reduction. However, the relief grooves of the kind shown at 118 and 120 of connection 100 are not critical because they are located in the larger cross-sectional areas of pin 102 and box 106. Thus, they do not become critical in the overall efficiency of the connection.

With the single hook thread profile, as shown in FIGS. 9A–9D and recommended for use in connection 900A, an interference between the major and minor thread diameters, i.e. thread crests 964 of pin 950 and thread roots 984 of box 970, can be developed on power fight make up. Furthermore, interference between adjacent load flanks and minimal clearance between adjacent stab flanks can be provided on power fight make up. Any interferences of the roots and crests of the threads causes a hoop stress in the pin and box members 650 and 670, respectively. Consequently, upon power tight make-up, if any interference is present, the thread metal tends to move due to Poisson's effect causing the load flanks to butt up and engage. The interference will vary depending upon the pipe diameters and the grade of the pipe. With reference to FIG. 9A, preferably, the diametrical interference is maximized at thread sections 902 and 904 adjacent center-shoulder seal 910 and is gradually reduced to a minimum at thread sections 906 and 908 at the terminal ends of connection 900A. This gradual reduction in diametrical interference is designed to protect the thin walled member thread sections such as 934 of pin member 950 at the terminal ends of the connection. The larger cross-sectional areas adjacent the center-shoulder seal 900A are more rigid and therefore can have greater diametrical interference and absorb greater hoop stress. The cross-sectional areas of both pin member 950 small step and the box member 970 large step adjacent each side of the center shoulder seal 910 are designed to be approximately equal. The inner diametrical interference between the thread crests and roots is controlled to achieve linear stresses in the greater cross-sectional area of the box and pin members as well as achieve linear stresses at the thinner cross-sectional areas of the pin and box members adjacent their terminal ends. A certain amount of diametrical interference is required to achieve a tight interengaging fit of the threads. The general rule is that the interference will vary between 0.001 and 0.002 inches per inch of diameter, with less interference at the terminal ends of the connection than adjacent the center-shoulder seal.

The preferred center seal is one that is isolated to the loads placed on the pipe string. In other words, center shoulder seal 910 of connection 900A should remain stable and insensitive to varying loads placed on the connection. The locked double shoulder seal shown at 910 of connection 900A includes redundant sealing systems, i.e. a multiplicity of metal-to-metal seals, to achieve an effective sealing engagement such that the seal does not deactivate upon the application of various loads to the connection such as internal and external pressure, axial tension or compression, and torsional and bending moments.

The preferred embodiments of the present invention, as described above and shown in the Figures are not intended to limit the scope of the present invention, as demonstrated by the claims which follow, since one skilled in the art can, with minimal experimentation, extend the scope of the embodiments to match that of the claims.

What is claimed is:

1. A tubular connection comprising at least two members, wherein each member comprises at least two threaded sections having a center shoulder disposed between said at least two threaded sections, said center shoulders sealingly engaging to form a center shoulder seal configuration, said at least two threaded sections including at least one stabilizing thread section present on each connection member adjacent said center shoulder seal configuration engaging threads on the other connection member, said stabilizing thread section comprising a full run-out thread section for stabilizing said center shoulder seal configuration, said threaded sections including threads having means for stabilizing said members during make-up of the connection.

2. The tubular connection of claim 1, wherein the profile of said threaded sections is a double hook thread profile and wherein said at least two threaded sections include full height threads and said stabilizing means includes a chamfer on the stab flank of said full-height threads.

3. The tubular connection of claim 1 wherein said center shoulder seal configuration is a hook shoulder thread profile and wherein said at least two threaded sections include full height threads and said stabilizing means includes a chamfer on the stab flank of said full-height threads.

4. The tubular connection of claim 1 wherein said center shoulder seal configuration is a square shoulder with frustum seal.

5. The tubular connection of claim 1 wherein said center shoulder seal configuration includes annular shoulders.

6. The tubular connection of claim 1 wherein said center shoulder seal configuration is a shoulder comprising grooves.

7. The tubular connection of claim 1 wherein said center shoulder seal configuration is a shoulder comprising an annulus having an axial undercut.

8. The tubular connection of claim 1 wherein each of said center shoulders forms a groove and said center shoulders extrude a portion of their mass laterally into said grooves upon assembly of the connection.

9. A tubular connection comprising:

two members having terminal ends, each member having at least two threaded sections with a center shoulder disposed between said at least two threaded sections, said center shoulders sealingly engaging to form a center shoulder seal configuration;

said at least two threaded sections including at least one stabilizing thread section present on each said connection member engaging threads on the other connection member, said at least one stabilizing threaded section including a run-out thread section located adjacent said center shoulder seal configuration for stabilizing said center shoulder seal configuration;

each member having said run-out thread section located between said center shoulder seal configuration and said leading terminal end; and said threaded sections including threads having means for centering one member with respect to the other member make-up of the connection.

10. The tubular connection of claim 9, wherein each said connection member includes a full-height lead-in thread section opposite said run-out thread section on the other connection member.

11. The tubular connection of claim 10, wherein each connection member includes a thread relief groove located between said center shoulder and said full height lead-in thread section.

12. The tubular connection of claim 11, wherein said members each have trailing ends and further include at least one additional stabilizing run-out thread section between said center shoulder seal configuration and said trailing end of each connection member.

13. The tubular connection of claim 12, wherein said center shoulder seal configuration comprises a locked double shoulder configuration.

14. The tubular connection of claim 11, wherein said center shoulder seal configuration comprises a locked double shoulder configuration.

15. The tubular connection of claim 10, wherein said center shoulder seal configuration comprises a locked double shoulder configuration.

16. The tubular connection of claim 10, wherein said members each have trailing ends and further include at least one additional stabilizing run-out thread section between said center shoulder seal configuration and said trailing end of each connection member.

17. The tubular connection of claim 16, wherein said center shoulder seal configuration comprises a locked double shoulder configuration.

18. The tubular connection of claim 17, wherein the profile of said threaded sections is a single hook thread profile, and wherein said centering means includes full-height threads having chamfered stab flanks.

19. The tubular connection of claim 17, wherein the profile of said threaded sections is a double hook, and wherein the absolute sum of the positive stab flank and negative load flank angle is less than 5 degrees.

20. The tubular connection of claim 17, wherein the profile of said threaded sections is a single hook, wherein the negative load flank angle is less than 15 degrees, and wherein the stab flank angle ranges from zero degrees to a negative angle of about 35 degrees.

21. The tubular connection of claim 20, wherein said negative load flank angle is less than 4 degrees, wherein the absolute sum of said negative load flank angle and said stab flank angle is less than 5 degrees, and wherein said centering means includes full-height threads having chamfered stab flanks.

22. The tubular connection of claim 16, wherein the profile of said threaded sections is a single hook thread profile and wherein said centering means includes full-height threads having chamfered stab flanks.

23. The tubular connection of claim 16, wherein the profile of said threaded sections is a double hook, and wherein the absolute sum of the positive stab flank and negative load flank angle is less than 5 degrees.

24. The tubular connection of claim 16, wherein the profile of said threaded sections is a single hook, wherein the negative load flank angle is less than 15 degrees, and wherein the stab flank angle ranges from zero degrees to a negative angle of about 35 degrees.

25. The tubular connection of claim 24, wherein said negative load flank angle is less than 4 degrees, wherein the absolute sum of said negative load flank angle and said stab flank angle is less than 5 degrees, and wherein said centering means includes full-height threads having chamfered stab flanks.

26. The tubular connection of claim 9, wherein each said member includes a run-in thread section at a location corresponding with said run-out thread section on the corresponding other connection member.

27. The tubular connection of claim 26, wherein said center shoulder seal configuration comprises a locked double shoulder configuration.

28. The tubular connection of claim 26, wherein said members each have trailing ends and further include at least one additional stabilizing run-out thread section between said center shoulder seal configuration and said trailing end of each connection member.

29. The tubular connection of claim 28, wherein said center shoulder seal configuration comprises a locked double shoulder configuration.

30. The tubular connection of claim 29, wherein the profile of said threaded sections is a single hook thread profile, and wherein said centering means includes full-height threads having chamfered stab flanks.

31. The tubular connection of claim 29, wherein the profile of said threaded sections is a double hook, and wherein the absolute sum of the positive stab flank and negative load flank angle is less than 5 degrees.

32. The tubular connection of claim 29, wherein the profile of said threaded sections is a single hook, wherein the negative load flank angle is less than 15 degrees, and wherein the stab flank angle ranges from zero degrees to a negative angle of about 35 degrees.

33. The tubular connection of claim 32, wherein said negative load flank angle is less than 4 degrees, wherein the absolute sum of said negative load flank angle and said stab flank angle is less than 5 degrees, and wherein said centering means includes full-height threads having chamfered stab flanks.

34. The tubular connection of claim 28, wherein the profile of said threaded sections is a single hook thread profile, and wherein said centering means includes full-height threads having chamfered stab flanks.

35. The tubular connection of claim 28, wherein the profile of said threaded sections is a double hook, and wherein the absolute sum of the positive stab flank and negative load flank angle is less than 5 degrees.

36. The tubular connection of claim 28, wherein the profile of said threaded sections is a single hook, wherein the negative load flank angle is less than 15 degrees, and wherein the stab flank angle ranges from zero degrees to a negative angle of about 35 degrees.

37. The tubular connection of claim 36, wherein said negative load flank angle is less than 4 degrees, wherein the absolute sum of said negative load flank angle and said stab flank angle is less than 5 degrees, and wherein said centering means includes full-height threads having chamfered stab flanks.

38. The tubular connection of claim 9, wherein each member's at least two threaded sections are comprises of a two step thread.

39. The tubular connection of claim 38, wherein said center shoulder seal configuration comprises a locked double shoulder configuration.

40. The tubular connection of claim 1 or claim 9 wherein said center shoulder seal configuration comprises a locked double shoulder configuration.

41. The tubular connection of claim 1 or claim 9, wherein the profile of said threaded sections is a single hook.

42. The tubular connection of claim 1 or claim 9, wherein the profile of said threaded sections is a double hook, and wherein the absolute sum of the positive stab flank and negative load flank angle is less than 5 degrees.

43. The tubular connection of claim 1 or claim 9, wherein the profile of said threaded sections is a single hook, wherein the negative load flank angle is less than 15 degrees, and wherein the stab flank angle ranges from zero degrees to a negative angle of about 35 degrees.

44. The tubular connection of claim 1 or claim 9 wherein said center shoulder seal configuration is a square shoulder.

45. The connection of claim 9 wherein said center seal shoulder configuration includes a first shoulder having a first undercut surface on said box member and a second shoulder having a second undercut surface on said pin.

46. The connection of claim 45 wherein said first shoulder sealingly engages said second undercut surface and said second shoulder sealingly engages said first undercut surface.

47. The connection of claim 46 wherein said first and second undercut surfaces each have a portion thereof which interferringly engages said second and first shoulders respectively.

48. A tubular connection comprising two tubular members, wherein each connection member comprises threaded sections having a center shoulder disposed between two of said threaded sections, said center shoulders sealingly engaging to form a center shoulder seal configuration, each connection member having a leading terminal end and a trailing end, said threaded sections including a first run-out thread section adjacent said center shoulder seal configuration for engaging threads on another connection member and located between said center shoulder seal configuration and said leading terminal end; a second run-out thread section adjacent the trailing end of each connection member; a run-in threaded sections on each connection member located opposite said run-out threaded section on the other connection member; and said threaded sections having threads with chamfered stab flanks.

49. The tubular connection of claim 48, wherein said center should seal configuration comprises a locked double shoulder configuration.

50. A tubular connection comprising:
pin and box members having engaging threaded sections, said box member having a first center shoulder and said pin member having a second center shoulder, said first and second center shoulders forming a locked double shoulder configuration;
said first center shoulder including a first shoulder and a first undercut surface, said first shoulder and first undercut surface forming a surface extending therebetween;
said second center shoulder including a second shoulder and a second undercut surface, said second shoulder and second undercut surface forming a second surface extending therebetween;
said first shoulder sealingly engaging said second undercut surface and said second shoulder sealingly engaging said first undercut surface; and
said threaded sections including threads having means for centering said pin member within said box member during make-up.

51. The tubular connection of claim 50 wherein said first shoulder includes a first exterior sealing surface and said first undercut surface includes a first interior sealing surface; said second shoulder includes a second exterior sealing surface and said second undercut surface includes a second interior sealing surface; whereby said first exterior sealing surface forms a metal-to-metal seal with said second interior sealing surface and said second exterior sealing surface forms a metal-to-metal seal with said first interior sealing surface.

52. The tubular connection of claim 51 wherein said first and second external sealing surfaces are formed by beveled surfaces on said first and second shoulders.

53. The tubular connection of claim 51 wherein said box and pin members include ramp surfaces for aligning and guiding said first and second exterior sealing surfaces into sealing engagement with said second and first interior sealing surfaces respectively.

54. The tubular connection of claim 50 wherein said first and second surfaces are generally parallel to the axis of the connection.

55. The tubular connection of claim 50 wherein said first surface provides a seal with said second surface.

56. The tubular connection of claim 50 wherein said box member further includes a first interior ramp surface extending from said first undercut surface and a first exterior ramp surface extending from said first shoulder and said pin member further includes a second interior ramp surface extending from said second undercut surface and a second exterior ramp surface extending from said second shoulder, said first interior ramp surface sealing with said second exterior ramp surface and said second interior ramp surface sealing with said first exterior ramp surface.

57. A tube and coupling connection comprising:
a tube member and a coupling member having engaging threaded sections, said tube member having a first center shoulder and said coupling member having a second center shoulder, said first and second center shoulders forming a locked double shoulder configuration;
said first center shoulder including a first shoulder and a first undercut surface;
said second center shoulder including a second shoulder and a second undercut surface;
said first shoulder sealingly engaging said second undercut surface and said second shoulder sealingly engaging said first undercut surface; and
said threaded sections including threads having means for centering said tube member within said coupling member during make-up.

58. A method of stabilizing a tubular connection which comprises at least two tubular members having a leading terminal end with each member having at least two threaded sections with threads having chamfered stab flanks and having a center seal disposed between said at least two threaded sections, said method comprising:
engaging the chamfered stab flanks of the threads to center one tubular member with respect to the other tubular member;
sealingly engaging the center seals to form a center seal configuration;
utilizing a run-out thread section as one of said at least two threaded sections adjacent said center seal configuration on each connection member for engaging threads on another tubular member, and
locating said run-out thread section adjacent said center seal and between said center seal configuration and said leading terminal end to stabilize the center seal configuration.

59. The method of claim 58, including utilizing an additional run-out thread section near a trailing end of each connection member.

60. The method of claim 58 or claim 59, including utilizing a run-in thread section on one member with said run-out thread section at a corresponding location on the other member.

61. Threads disposed on pin and box members of a tubular connection comprising:

first and second pin thread sections having different diameters on the pin member;

first and second box thread sections on the box member, said first pin and box thread sections and said second pin and box thread sections adapted for threaded engagement;

each of said threads on said thread sections including chamfered stab flanks as the stab flanks for at least the individual thread members on the pin and box which come into contact upon initial telescoping of the pin member into the box member of the tubular connection; and said first pin thread section adapted to stab through said second box thread section for engagement with said first box thread section whereby said chamfered stab flanks on said first pin and box thread sections contact and said chamfered stab flanks on said second pin and box thread sections contact for centering the pin member within the box member.

62. The threads of claim 61, wherein the threads include tapered threads and the height of said chamfer on said tapered threads is about equal to the step height from the preceding load flank to said stab flank of said tapered threads.

63. The threads of claim 61, wherein said threads have a load flank angle which is a negative angle of less than 15 degrees.

64. The threads of claim 63, wherein said threads have a stab flank angle which ranges from a negative angle of less than 8 degrees to a positive angle of less than 8 degrees.

65. The threads of claim 64, wherein said stab flank angle ranges from an angle of zero degrees to a positive angle of less than 3 degrees.

66. The threads of claim 65, wherein the absolute sum of said negative load flank angle and said zero degree to positive stab flank angle is less than 5 degrees.

67. The threads of claim 66 wherein said stab flank angle is essentially a zero degree angle.

68. Threads disposed on pin and box members of a tubular connection, each of said threads including chamfered stab flanks as the stab flanks for at least the individual thread members on the pin and box which come into contact upon initial telescoping of the pin member into the box member of the tubular connection, said threads being variable width threads having progressively increasing thread width.

69. The threads of claim 68, wherein the threads include tapered threads and the height of said stab flank chamfer on said tapered threads is about equal to the step height from the preceding load flank to said stab flank of said tapered threads.

70. A tubular connection member on a tubular pipe body and having a terminal end, at least two threaded sections and a center shoulder seal configuration disposed between said at least two threaded sections, said at least two threaded sections including at least one stabilizing thread section adjacent said center seal configuration, said stabilizing thread section comprising a first run-out thread, said threaded sections including threads having chamfered stab flanks.

71. The tubular connection member of claim 70, wherein said member includes a second run-out thread section adjacent said tubular pipe body.

72. The tubular connection member of claim 70 or claim 71, wherein said center-shoulder seal configuration comprises a double shoulder.

73. The tubular connection member of claim 72, wherein said threaded sections include a thread profile having a negative load flank angle of less than 15 degrees and a stab flank having an angle ranging form zero degree angle to a positive angle of less than 8 degrees.

74. The tubular connection member of claim 73, wherein said at least two threaded sections include full height threads, at least the full height threads being tapered and wherein the full height thread stab flanks which will come into contact upon initial telescoping of a connection pin member into a connection box member are chamfered.

75. The tubular connection member of claim 74, which the height of said chamfer is about equal to the step height between the preceding load flank and said chamfered stab flank.

76. The tubular connection member of claim 75, wherein said thread is a variable width thread having progressively increasing width as said threads progress away from said terminal end.

77. The tubular connection member of claim 70 or claim 71 wherein said threaded sections include a thread profile having a negative load flank angle of less than 15 degrees and a stab flank having an angle ranging from a zero degree angle to a positive angle of less than 10 degrees.

78. The tubular connection member of claim 77, wherein said at least two threaded sections includes full height threads, at least the full height threads being tapered and wherein the full height thread stab flanks which will come into contact upon initial telescoping of a connection pin member into a connection box member are chamfered.

79. The tubular connection member of claim 78, wherein the height of said chamfer is about equal to the step height between the preceding load flank and said chamfered stab flank.

80. The tubular connection member of claim 79, wherein said threads are variable width threads having progressively increasing width as said threads progress away from said terminal end.

81. A connection comprising:

a tubular box member having a terminal end and another end integral with a tubular pipe body;

a tubular pin member having a terminal end and another end integral with another tubular pipe body;

said pin and box members having a thick-walled portion adjacent said tubular pipe bodies and a thin-walled portion adjacent said terminal ends of said pin and box members;

said pin and box members each having a center shoulder between said thick-walled and thin-walled portions, said center shoulders sealingly engaging to form a center shoulder seal configuration;

said pin and box thin-walled portions having a run-out thread section adjacent said center shoulder seal configuration;

said pin and box thick-walled portions having a run-in thread section adjacent said center shoulder seal configuration;

said thread sections having means for centering said pin member within said box member; and wherein upon the assembly of the connection, there is threaded engagement between said run-out thread sections and said run-in thread sections.

82. The connection of claim 81 wherein said pin and box thin-walled portions have a run-in thread section adjacent said terminal end and said pin and box thick-walled portions have a run-out thread section adjacent said tubular pipe body, whereby upon assembly of the connection, said run-out thread sections threadingly engage said run-in thread sections.

83. The connection of claim 82 wherein said pin and box thin-walled portions and thick-walled portions include a full height thread section disposed between said run-in thread section and said run-out thread section, whereby upon the assembly of the connection, there is threaded engagement between said full height thread sections.

84. The connection of claim 83 wherein said threaded engagements are complementary engagements.

85. The connection of claim 83 wherein the width of the threads of each of said portions constantly increases from said terminal ends to said pipe bodies.

86. The connection of claim 83 wherein the profile of said threaded sections is a single hook.

87. The connection of claim 86 wherein said single hook profile exhibits a negative load flank angle in the range of zero to five degrees and a zero degree stab flank angle.

88. The connection of claim 86 wherein said single hook profile exhibits a negative load flank angle and a negative stab flank angle.

89. The connection of claim 88 wherein said negative load flank angle ranges from zero degrees to less than five degrees and said negative stab flank angle ranges from zero degrees to less than two degrees with the absolute sum of said angles being less than five degrees.

90. The connection of claim 81 wherein said center shoulder seal configuration is a locked double shoulder seal.

91. The connection of claim 90 wherein said locked double shoulder seal is two to three times as high in the radial direction than it is wide in the axial direction.

92. The connection of claim 91 wherein said height is ¼ to ⅓ the thickness of the pipe body.

93. The connection of claim 81 wherein said center shoulder seal includes annular shoulders on a taper with the longitudinal axis of the connection.

94. The connection of claim 81 wherein the profile of said threaded sections is a double hook.

95. The connection of claim 94 wherein said double hook profile exhibits a negative load flank angle and a positive stab flank angle.

96. The connection of claim 95 wherein said negative load flank angle ranges from zero degrees to less than five degrees and said positive stab flank angle ranges from zero degrees to less than two degrees with the absolute sum of said angles being less than five degrees.

97. The connection of claim 81 wherein said pin and box members are made of formed metal.

98. The connection of claim 81 wherein the connection is a flush joint connection with the outer diameter of said box member being generally the same as the outer diameters of said tubular pipe bodies.

99. The connection of claim 81 wherein the connection is a slim-line connection with the outer diameter of said box member being no more than 3.5% greater than the outer diameters of the tubular pipe bodies.

100. The connection of claim 81 wherein the crests and roots of the threads interferringly engage upon power tight make-up.

101. The connection of claim 81 wherein there are clearances between adjacent stab flanks upon power tight make-up.

102. The connection of claim 81 wherein said load flanks butt up and engage upon power tight make-up.

\* \* \* \* \*